United States Patent
Suzaka

(10) Patent No.: US 11,623,382 B2
(45) Date of Patent: Apr. 11, 2023

(54) METHOD FOR PRODUCING HOLLOW MOLDED ARTICLE AND INJECTION STRETCH BLOW MOLDING MACHINE

(71) Applicant: AOKI TECHNICAL LABORATORY, INC., Nagano (JP)

(72) Inventor: Keiichi Suzaka, Nagano (JP)

(73) Assignee: Aoki Technical Laboratory, Inc., Nagano (JP)

( * ) Notice: Subject to any disclaimer, the term of this patent is extended or adjusted under 35 U.S.C. 154(b) by 0 days.

(21) Appl. No.: 17/862,534

(22) Filed: Jul. 12, 2022

(65) Prior Publication Data

US 2023/0017761 A1 Jan. 19, 2023

(30) Foreign Application Priority Data

Jul. 13, 2021 (JP) .............................. JP2021-115888

(51) Int. Cl.
*B29C 49/06* (2006.01)
*B29C 49/48* (2006.01)
(Continued)

(52) U.S. Cl.
CPC ............ *B29C 49/062* (2013.01); *B29C 49/48* (2013.01); *B29C 49/56* (2013.01); *B29C 49/12* (2013.01);
(Continued)

(58) Field of Classification Search
CPC .. B29C 2049/48615; B29C 2049/4856; B29C 49/062; B29C 49/56
See application file for complete search history.

(56) References Cited

U.S. PATENT DOCUMENTS 2,750,624 A * 6/1956 Coates ................... B29C 49/36
425/326.1
4,321,029 A * 3/1982 Aoki ................... B29C 45/1625
425/533
(Continued)

FOREIGN PATENT DOCUMENTS

ES 2729306 T3 * 10/2019 ......... B29C 45/0055
JP H05147076 A 6/1993
(Continued)

OTHER PUBLICATIONS

Japan Patent Office, Notice of Reasons for Refusal, for corresponding Japanese Application No. 2021-115888, Date of Drafting, Oct. 4, 2021, 4 pages.

(Continued)

*Primary Examiner* — Robert B Davis
(74) *Attorney, Agent, or Firm* — Christopher & Weisberg, P.A.

(57) ABSTRACT

A blow mold high-pressure switching step in a blow molding process of an injection stretch blow molding machine is arranged at the first half portion of the blow molding process, to shorten the injection molding process and improve the moldability. The blow mold high-pressure switching step 61B3 of increasing a mold clamping force for blow molds which have been closed in a blow molding process 61B is configured to be performed at a timing within a time from the start of the upper/lower mold opening step 62A1 for opening upper and lower molds in the injection molding process 62A to release a preform 3P to the completion of the injection mold high-pressure switching step 62A3 for increasing the mold clamping force for the closed injection molding mold.

5 Claims, 14 Drawing Sheets

(51) Int. Cl.
 B29C 49/56 (2006.01)
 B29C 49/12 (2006.01)
(52) U.S. Cl.
 CPC ............. *B29C 2049/4889* (2013.01); *B29C 2049/48615* (2022.05)

(56) References Cited

U.S. PATENT DOCUMENTS

| | | | |
|---|---|---|---|
| 4,741,688 A * | 5/1988 | Aoki | B29C 49/6472 425/529 |
| 6,773,251 B2 * | 8/2004 | Nightingale | B29C 49/36 425/192 R |
| 11,065,801 B2 | 7/2021 | Nakazawa et al. | |
| 2008/0029936 A1 | 2/2008 | Mehnert | |
| 2008/0118686 A1 | 5/2008 | Glasgow et al. | |
| 2015/0258726 A1 | 9/2015 | Berg, Jr. et al. | |
| 2018/0079122 A1 | 3/2018 | Aoki et al. | |
| 2020/0147853 A1 | 5/2020 | Nakazawa et al. | |

FOREIGN PATENT DOCUMENTS

| | | | | |
|---|---|---|---|---|
| JP | 2005007797 A | * | 1/2005 | |
| JP | 201713337 A | | 1/2017 | |
| JP | 2019188630 A | | 10/2019 | |
| KR | 1020210005808 A | | 1/2021 | |
| TW | 201302433 A | | 1/2013 | |
| TW | 201700255 A | | 1/2017 | |
| WO | WO-8803472 A | * | 5/1988 | ........... B29C 49/062 |
| WO | WO-2004007176 A1 | * | 1/2004 | ............ B29C 49/36 |

OTHER PUBLICATIONS

European Patent Office, European Search Report, dated Dec. 8, 2022, 12 pages for corresponding EP Application No. 22183372.6-1014.

Korean Intellectual Property Office, Korean Office Action, dated Dec. 15, 2022, 4 pages for corresponding KR Application No. 10-2022-0085554.

Canadian Intellectual Property Office, Canadian Office Action dated Jan. 5, 2023 for corresponding Canadian Patent Application No. 3,167,511, consisting of 4 pages.

Taiwan Intellectual Property Office, Taiwanese Office Action dated Feb. 2, 2023 for corresponding Taiwan Patent Application No. 111124445, consisting of 8 pages.

* cited by examiner

CONVENTIONAL ART

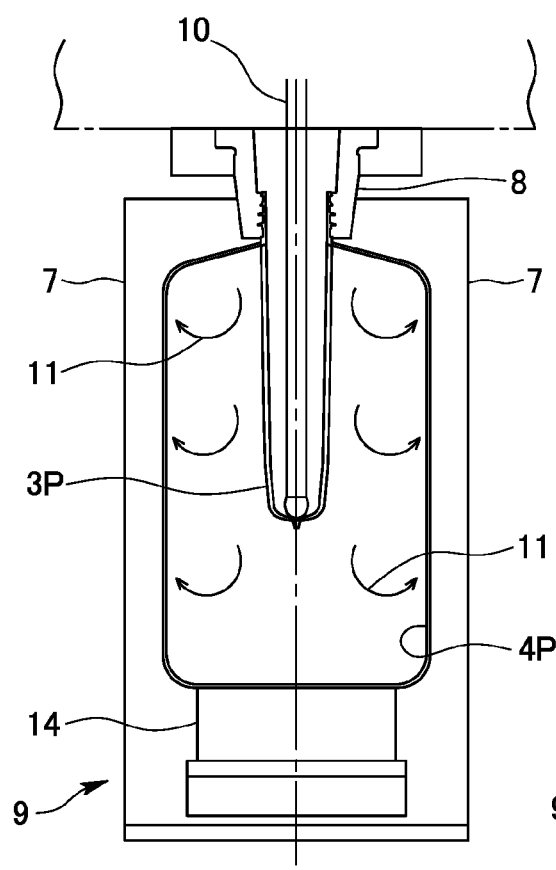
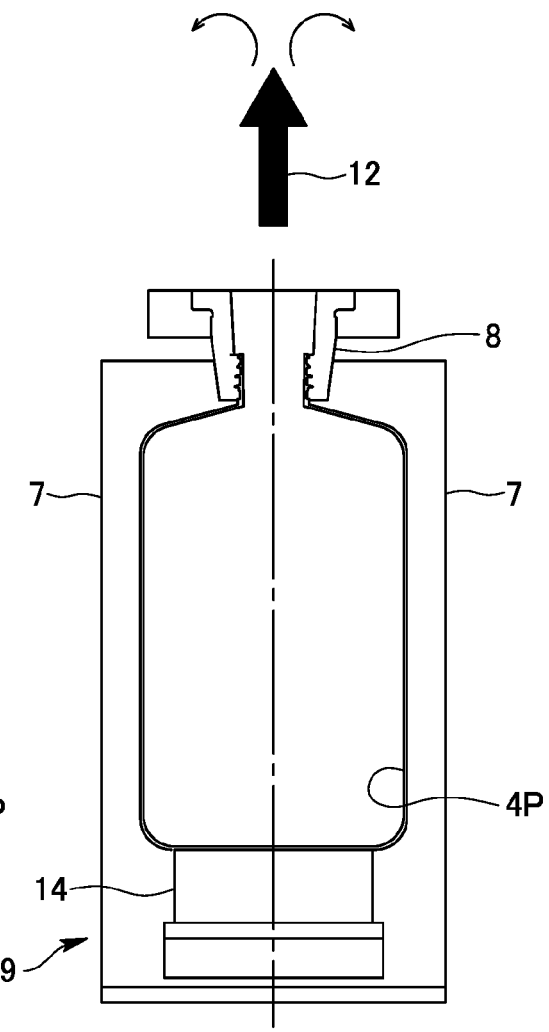
FIG. 7A
FIG. 7B

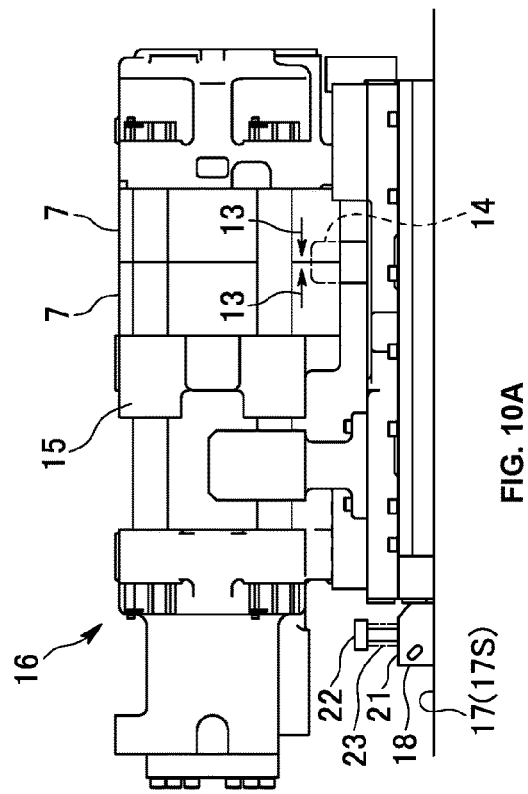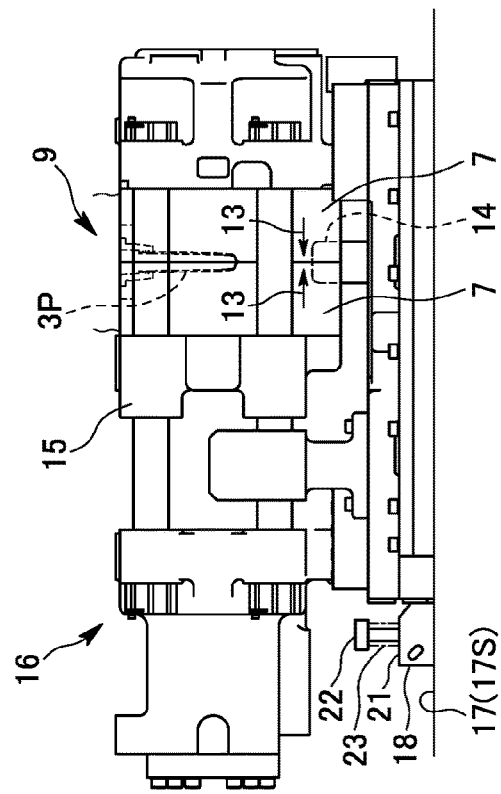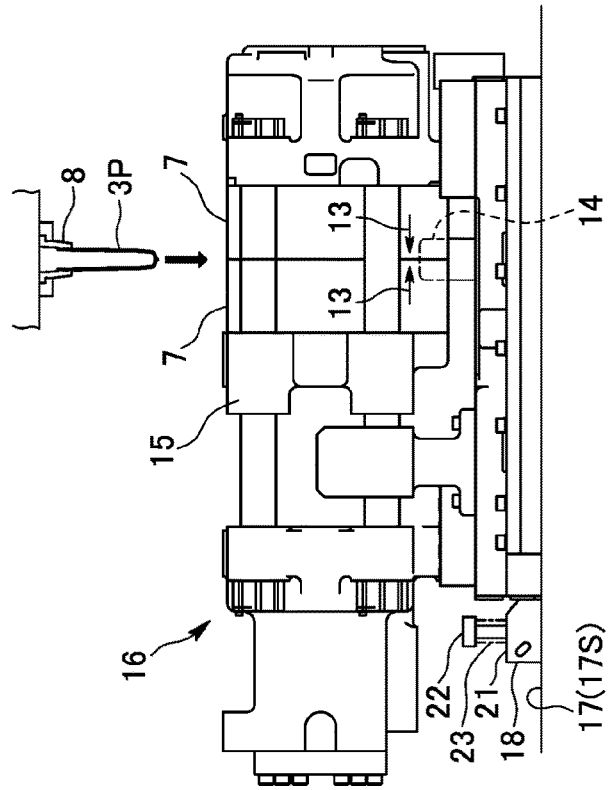

METHOD FOR PRODUCING HOLLOW MOLDED ARTICLE AND INJECTION STRETCH BLOW MOLDING MACHINE

CROSS-REFERENCE TO RELATED APPLICATION

This application claims priority to Japanese Patent Application No. 2021-115888, filed Jul. 13, 2021, entitled "METHOD FOR PRODUCING HOLLOW MOLDED ARTICLE AND INJECTION STRETCH BLOW MOLDING MACHINE", the entirety of which is incorporated herein.

FIELD

The present invention relates to a method for producing a hollow molded article made of a synthetic resin such as a PET bottle and an injection stretch blow molding machine.

BACKGROUND

An injection stretch blow molding machine has been conventionally known which has an injection molding section, a blow molding section, and an ejection section as an apparatus for performing a series of processes from molding of a preform to molding of a hollow molded article.

FIG. 1 schematically illustrates an injection stretch blow molding machine 1. In FIG. 1, the injection stretch blow molding machine 1 includes an injection molding section 3, a blow molding section 4, and an ejection section 5 which are disposed in a rotation direction of a rotary plate (not illustrated) provided with a lip mold, in this order at constant angular intervals. The injection molding section 3 is configured to supply a molten resin from an injection apparatus 2, the blow molding section 4 is configured to perform blow molding to form a hollow molded article, and the ejection section 5 is configured to eject the hollow molded article to the outside of the machine 1. Movement indicated with an arrow in FIG. 1 shows the rotation direction of the rotary plate, also showing the moving direction of the lip mold.

The injection molding section 3 has an injection molding mold configured by combining the lip mold with an upper mold (injection core mold) and a lower mold (injection cavity mold). The injection molding section 3 is a section configured to supply a molten resin from the injection apparatus 2 to the injection molding mold, which has been clamped with high pressure to close the molds and then to injection mold a preform.

The injection molded preform is supported by the lip mold, and is released from the upper and lower molds by ascending action of the rotary plate when the upper and lower molds are opened. Then, the rotary plate rotates and moves the preform to the blow molding section 4 together with the movement of the lip mold.

The blow molding section 4 has a blow molding mold which is configured by combining the lip mold with a blow mold composed of a pair of split molds. Mold closing and high-pressure clamping of the blow molding mold is performed while the preform is positioned between the split molds of the blow mold. In this state, in the blow molding section 4, the preform, which is supported by the lip mold and disposed in the blow molding mold, is stretched by a stretching rod and air blown by blowing air to form (blow mold) a hollow molded article.

After blow molding, the hollow molded article is released by ascending action of the rotary plate while the blow mold is opened. After that, the rotary plate rotates in a state in which the hollow molded article is supported by the lip mold, so that the hollow molded article is moved to the ejection section 5.

After the hollow molded article has been moved to the ejection section 5, the lip mold is opened to release the holding state of the hollow molded article. Then, the hollow molded article detached from the lip mold is ejected to the outside of the molding machine 1 in the ejection section 5.

Furthermore, the lip mold releasing the hollow molded article is moved to the injection molding section 3 by the rotation of the rotary plate, and then the lip mold is introduced again into the injection molding mold described above.

As disclosed in Patent Literature 1, the rotary plate includes three positions where three lip molds are arranged to correspond to the injection molding section 3, the blow molding section 4, and the ejection section 5, respectively. Then, when the rotary plate rotates by a constant rotation angle in a predetermined direction, the three lip molds move intermittently in the predetermined direction while being positioned at the corresponding positions, which are different from one another. With this configuration, the preform is moved from the injection molding section 3 to the blow molding section 4, and simultaneously, the hollow molded article is moved from the blow molding section 4 to the ejection section 5.

Therefore, the injection stretch blow molding machine 1 performs, as illustrated in FIG. 2, hollow molded article producing processes 6 each including the injection molding section 3, the blow molding section 4, and the ejection section 5 performed simultaneously in multiple sections, and the hollow molded article producing processes 6 are performed while being shifted one stage behind the preceding process. In this manner, the injection stretch blow molding machine 1 is configured to efficiently produce hollow molded articles.

In FIG. 2, reference numerals 61, 62, 63, and 64 denote respective hollow molded article producing processes 6 in the order of proceeding the processes.

In FIG. 2, the four hollow molded article producing processes 61, 62, 63, and 64 are illustrated. Of course, the entire process does not terminate at the end of the fourth hollow molded article producing process 64, but a subsequent other hollow molded article producing process 6 will be started and performed sequentially while being shifted one stage behind the preceding process. Then, hollow molded articles are produced by each of the hollow molded article producing processes 61, 62, 63, 64 . . . .

CITATION LIST

Patent Literature 1: Japanese Patent Application Laid-Open No. 2019-188630

SUMMARY

Technical Problem

In the injection stretch blow molding machine 1, a single rotary plate rotates by a constant rotation angle at an ascending position, so that the lip molds are allowed to be disposed corresponding to the injection molding section 3, the blow molding section 4, and the ejection section 5, respectively. Therefore, the time when the lip mold is positioned in the injection molding section 3, the time when the lip mold is positioned in the blow molding section 4, and the time when the lip mold is positioned in the ejection section 5 are the same as one another.

As illustrated in FIG. 2, each of the hollow molded article producing processes 61, 62, 63, 64, . . . is composed of an injection molding process 61A, 62A, 63A, 64A, . . . for injection molding a preform in the injection molding section 3, a blow molding process 61B, 62B, 63B, 64B, . . . for blow molding a hollow molded article from the preform in the blow molding section 4, and an ejection process 61C, 62C, 63C, 64C, . . . for ejecting the blow molded hollow molded article to the outside of the machine in the ejection section 5. In other words, the hollow molded article producing process 61 includes an injection molding process 61A, a blow molding process 61B, and an ejection process 61C. The hollow molded article producing process 62 includes an injection molding process 62A, a blow molding process 62B, and an ejection process 62C. The hollow molded article producing process 63 includes an injection molding process 63A, a blow molding process 63B, and an ejection process 63C. The hollow molded article producing process 64 includes an injection molding process 64A, a blow molding process 64B, and an ejection process 64C.

Furthermore, each of the injection molding processes 61A, 62A, 63A, 64A, . . . , and the blow molding processes 61B, 62B, 63B, 64B, . . . is composed of a plurality of steps. First, the injection molding process 62A of one of the hollow molded article producing processes 6 (i.e., 62) will be described.

The same applies to the injection molding processes 61A, 63A, 64A, . . . of the other hollow molded article producing processes 6 (61, 63, 64, . . . ).

Injection molding process in FIGS. 3 and 4:
  FIGS. 3 and 4 illustrate molding flows of the injection molding processes 61A, 62A, 63A, 64A, . . . and the blow molding processes 61B, 62B, 63B, 64B, . . . of the plurality of hollow molded article producing processes 61, 62, 63, 64, . . . , which are shifted one stage behind the preceding process.
  Note that, in the molding flows illustrated in FIGS. 3 and 4, a part of a blow molding process 59B in a hollow molded article producing process 59 prior to the hollow molded article producing process 61, a part of an injection molding process 60A in another prior hollow molded article producing process 60, a part of a blow molding process 64B in a hollow molded article producing process 64 after the hollow molded article producing process 61, and a part of an injection molding process 65A in another following hollow molded article producing process 65 are also illustrated.
  This relationship also applies to molding flows described later in embodiments.

In FIGS. 3 and 4, each of ranges indicated by a section X, for example, denotes: each of
  the injection molding process 61A in the hollow molded article producing process 61,
  the blow molding process 61B in the hollow molded article producing process 61,
  the injection molding process 62A in the hollow molded article producing process 62,
  the blow molding process 62B in the hollow molded article producing process 62,
  the injection molding process 63A in the hollow molded article producing process 63,
  the blow molding process 63B in the hollow molded article producing process 63, and
  the injection molding process 64A in the hollow molded article producing process 64.

Hereinafter, the injection molding process 62A of one hollow molded article producing process 62 will be described.

The injection molding section 3 where the injection molding process 62A is to be performed is provided with an injection molding mold configured to include an upper mold and a lower mold in addition to a lip mold.

As shown in FIGS. 3 and 4, the injection molding process 62A for obtaining a preform 3P from the injection molding mold includes an upper/lower mold opening step 62A1 (including a portion corresponding to rotation R and rotation lock L, which will be described later), an upper/lower mold clamping step 62A2, an injection mold high-pressure switching step 62A3, a nozzle advancement starting step 62A4, an injection starting step 62A5, an injecting step 62A6, and a cooling step 62A7.

The injection molding processes 61A, 63A, and 64A of the other hollow molded article producing processes 6 have the same step configuration, and the injection molding processes 61A, 62A, 63A, 64A, . . . are performed sequentially in the injection molding section 3 as described above.

In order to make it easier to distinguish the repeatedly performed processes, the reference symbols assigned to the hollow molded article producing process are partially used for the reference symbols of the injection molding process, the blow molding process, and the ejection process.

Furthermore, the reference symbols assigned to the hollow molded article producing process including the injection molding process and the blow molding process are also partially used for the reference symbols of the respective steps of the injection molding process and the blow molding process.

Upper/lower mold opening step 62A1:
  The injection molding process 62A includes the upper/lower mold opening step 62A1 as a first step.
  The upper/lower mold opening step 62A1 includes releasing a mold clamping force with a high pressure applied to the injection molding mold, which has been closed in the final step of a preceding injection molding process 61A, which has been performed in the preceding process, and causing the rotary plate to ascend while opening the upper mold and the lower mold as the mold opening.
  Then, a preform 3P molded by the injection molding process 61A previously performed is supported by the lip mold, and the rotary plate is caused to ascend to perform the releasing.

Rotation R:
  While the upper/lower mold opening step 62A1 is being performed, there is an operating portion in which the rotary plate rotates by a constant rotational angle (120°) after the preform has been released and the rotary plate has reached the upper predetermined height position. The portion corresponding to the aforementioned rotation in FIGS. 3 and 4 is denoted by R, and the range thereof is indicated by arrows.
  Specifically, the rotation R is an operation in which the lip mold and the preform 3P molded by the injection molding process 61A of the preceding process are moved from the injection molding section 3 to the blow molding section 4 and are stopped at the upper position above the blow molding mold, which will be described later.
  Furthermore, the rotation R is also an operation in the blow molding process 61B to be described later, wherein the lip mold and the hollow molded article 4P molded in the blow molding process 60B (the process one step before the blow molding process 61B) are moved from the blow molding section 4 to the ejection section 5 and are stopped at a predetermined height position in the ejection section 5.

The rotation R is also an operation wherein the lip mold releasing the hollow molded article 4P in the ejection section 5 is moved to the injection molding section 3 and stopped at the upper position above the injection molding mold.

Rotation lock L

There is also an operation of a rotation lock L following the rotation R. This rotation lock L is also an operation for the rotary plate, in which the rotation of the rotary plate is temporarily locked by a rotation lock member In FIG. 3, a portion corresponding to this operation is denoted by L in the upper/lower mold opening step 62A1, and the range thereof is indicated by an arrow.

Upper/lower mold clamping step 62A2:

Next, the upper/lower mold clamping step 62A2 is a step of overlaying the lip mold on the lower mold (injection cavity mold), and inserting the upper mold (injection core mold) from above through the lip mold to the lower mold to close the molds. The mold clamping force at this step is a relatively low pressure in this system.

Injection mold high-pressure switching step 62A3:

Next, the injection mold high-pressure switching step 62A3 of increasing the mold clamping force to a high pressure is performed.

After the injection mold high-pressure switching step 62A3 has been completed, the high-pressure mold clamping force is maintained until the cooling step 62A7 is completed.

Nozzle advancement starting step 62A4:

As the next step, the nozzle advancement starting step 62A4 is set. The nozzle advancement starting step 62A4 is a process provided to increase the pressure with which a nozzle of the injection apparatus 2 is in contact with a resin receiving portion on the side provided with the injection molding mold, and controls the timing of starting the nozzle advancement.

This step is configured as an operation where a predetermined pressure is instantaneously reached, or an operation where a predetermined pressure is reached with a small amount of time.

Injection starting step 62A5:

The successive step is the injection starting step 62A5. The injection starting step 62A5 controls the injection start timing at the time of injecting a molten resin.

Injecting step 62A6:

The next step is the injecting step 62A6. The injecting step 62A6 is a step of filling the molten resin and holding the injection pressure. The time of the step varies depending on the size, shape, and other factors of the preform to be injection molded.

Cooling step 62A7:

The next step is the cooling step 62A7. The cooling step 62A7 includes cooling the preform 3P in the injection molding mold.

After the preform 3P injection molded in the injection molding process 61A of the preceding process is moved to the blow molding section 4 in the blow molding process 61B currently performed while being supported by the lip mold as described above, an operation of obtaining a hollow molded article 4P in the blow molding section 4 is performed.

The blow molding section 4 has the blow molding mold which is configured by the blow mold composed of a pair of split molds, which is configured to receive the lip mold. The blow molding process 61B of obtaining the hollow molded article 4P by the blow molding mold is a process that is performed simultaneously with the injection molding process 62A, as illustrated in FIG. 2.

Blow molding process 61B in FIGS. 3 and 4:

The blow molding process 61B includes a blow mold closing starting step 61B1 (see FIGS. 5 and 6), a blow mold quick operation step 61B2, a blow mold high-pressure switching step 61B3, a blowing step 61B4, a blow air exhausting step 61B5, a blow mold pressure releasing step 61B6, and a blow mold opening step 61B7, which are configured so as to be performed in this order, and thus, the blow molding process 61B, 62B, 63B, 64B, or the like is repeatedly performed in the blow molding section 4.

As described above, the blow molding process of the preceding process 6 and the blow molding process of the following process 6 are denoted by the reference numerals 60B and 62B with respect to the blow molding process 61B that is currently performed.

Blow mold closing starting step 61B1:

At the time when the final step of the blow molding process 60B of the preceding process 6 is completed, the pair of split blow molds is opened. As a first step of the blow molding process 61B that follows the final step of the process 60B, the blow mold closing starting step 61B1 is performed, for example, see FIGS. 5 and 6.

In the blow mold closing starting step 61B1, the hollow molded article 4P obtained by the blow molding process 60B of the preceding process is released by the ascending operation of the rotary plate while being supported by the lip mold from the pair of opened split blow molds, and after that, the pair of opened blow molds is controlled to start approaching each other.

The hollow molded article 4P released from the blow molding mold moves to the ejection section 5 by the lip mold.

The operation time of the blow mold closing starting step 61B1 can be set to 0.00 second or 0.50 seconds, so that, when the rotary plate is located at the ascending position, for example, the setting corresponds to the upper/lower mold opening step 62A1 or the like.

Note that, in the conventional example illustrated in FIGS. 3 and 4, at the early stage of the blow molding process 61B, the timing of the blow mold closing starting step 61B1 is controlled to coincide with the timing for quickly operating the blow mold in the next step (blow mold quick operation step 61B2), any independent time for performing the blow mold closing starting step 61B1 is not particularly set.

This also applies to the blow molding process 60B of the preceding process 6 and the blow molding process 62B of the following process 6.

Blow mold quick operation step 61B2:

The blow mold quick operation step 61B2 is a step of closing the pair of split blow molds. This step 61B2 is set to a time period within which the rotary plate is located in the ascending position, and to a time period within which the rotation R in the upper/lower mold opening step 62A1 is performed.

In the conventional example of FIGS. 3 and 4, the blow mold quick operation step 61B2 is configured to start at a timing within the rotation R of the injection molding process 62A.

Placement of preform into blow mold:

In the blow molding section 4, in order to position the preform 3P inside the blow mold, the lip mold provided to the rotary plate and the preform supported by the lip mold are located above the blow molding mold, and the rotary plate descends and the lip mold is overlaid on the blow mold to be combined together.

In doing so, the movement of placing the preform 3P to the blow mold should be performed at the same time as the rotation lock L in the injection molding process 61A.

The point in time at which the preform 3P is placed in the blow mold is indicated by arrows D in FIGS. 3 and 4.

FIG. 5 illustrates the blow molding section 4. In the blow mold quick operation step 61B2, the blow molding section 4 in FIG. 5 is in a state (a) of applying a low-pressure mold clamping force to cause the pair of separated blow molds 7 to approach each other, and a state (b) of bringing the separated blow molds 7 into contact with each other to close the molds.

In a state where the blow molds 7 are closed, an opening for receiving a preform is formed on an upper surface side of the blow molds 7, where the lip mold 8 can be placed.

Then, after the blow mold quick operation step 61B2, at the time pointed by the arrow D described above, the preform 3P is lowered by the descending action of the rotary plate, so that the lip mold 8 is combined with the upper portion of the blow molds 7 as illustrated in FIG. 6 to form the blow molding mold, inside of which the preform 3P is disposed.

Blow mold high-pressure switching step 61B3:
The blow mold high-pressure switching step 61B3 is a step of increasing a mold clamping force to be applied to the pair of blow molds.

After the predetermined mold clamping force has been reached (the blow mold high-pressure switching step 61B3 is completed), the high-pressure mold clamping force is maintained until the blow mold pressure releasing step 61B6 to be described later.

Blowing step 61B4:
Next, FIG. 7(a) illustrates the blowing step 61B4. The blowing step 61B4 includes inserting a stretching rod 10 into the preform 3P located in the blow molding mold 9 to stretch the preform 3P, and blowing blow air 11 into the preform 3P to blow mold the hollow molded article 4P. In the drawing, the blow air 11 is indicated by arrows within the hollow molded article 4P.

It should be noted that although this step is expressed using the term "blowing step", the step includes the operation of the blow molding consisting of stretching and blowing a blow air, and of course, it does not mean only performing blowing or blowing time period.

Blow air exhausting step 61B5:
Next, the blow air exhausting step 61B5 is a step of exhausting the blow air, which has been supplied into the hollow molded article within the blow molding mold 9, illustrated in FIG. 7(b). The blow air exhausted therefrom is schematically indicated by an arrow 12 in FIG. 7(b).

Blow mold pressure releasing step 61B6:
Next, the blow mold pressure releasing step 61B6 is a step of releasing the mold clamping force applied to the pair of closed blow molds.

Blow mold opening step 61B7:
Next, the blow mold opening step 61B7 is a step of opening the pair of closed blow mold.

As described above, in the injection stretch blow molding machine 1, the preform 3P injection-molded in the injection molding section 3 is transferred to the blow molding section 4, the hollow molded article 4P is blow molded from the preform 3P in the blow molding section 4, and the blow molded hollow molded article 4P is transferred to the ejection section 5 and is ejected to the outside of the molding machine in the ejection section 5.

In the injection stretch blow molding machine 1, the injection molding process (61A, 62A, 63A, 64A, . . . ) is repeatedly performed in the injection molding section 3 as illustrated in FIGS. 3 and 4 to perform injection molding of the preform 3P, and the blow molding process (60B, 61B, 62B, 63B, . . . ) is also repeatedly performed in the blow molding section 4. As a result, the preform 3P from the injection molding section 3 is blown and stretched to blow mold the hollow molded article 4P.

FIGS. 3 and 4 show the molding flows of the respective steps of the injection molding processes 61A, 62A, 63A, 64A, . . . and the blow molding processes 60B, 61B, 62B, 63B, . . . , and show the sequence of the respective steps of the injection molding processes 61A, 62A, 63A, 64A, . . . in the performed order and the time of the respective steps as a length. In addition, FIGS. 3 and 4 show the start timings of the sequence of the respective steps of the blow molding processes 60B, 61B, 62B, 63B, . . . associated with the steps of the injection molding processes 61A, 62A, 63A, 64A, . . . Similarly, FIGS. 3 and 4 show the time of the respective steps as a length.

As shown in this molding flow, the conventional injection stretch blow molding machine 1 starts the blow mold high-pressure switching step 61B3 of the blow molding process 61B, for example, at a timing coinciding with the timing at which the injection mold high-pressure switching step 62A3 of the injection molding process 62A is completed.

This is because the timing at which the steps from the nozzle advancement starting step 62A4 to the cooling step 62A7 are completed in the injection molding process 62A and the timing at which the steps from the blow mold high-pressure switching step 61B3 to the blow mold opening step 61B7 are completed in the blow molding process 61B are adjusted to coincide with each other.

In other words, the reason for making the end timings of the injection molding process 62A and the blow molding process 61B coincide with each other is that the rotary plate can cause to ascend without setting any end waiting time of the process (for example, a waiting time for the completion of the blow molding process 61B set in the injection molding process 62A if the injection molding process 62A is finished prior to the blow molding process 61B).

In the molding flows of FIGS. 3 and 4, the timings at the ends of the injection molding processes 61A, 62A, 63A, 64A and the blow molding processes 60B, 61B, 62B, 63B are made coincide with each other. However, when the respective processes are completed, the mechanical operations of the injection molding section 3 and the blow molding section 4 need not be stopped simultaneously, and the waiting time may be set for the injection molding section 3 side or the blow molding section 4 side. This also applies to first and second embodiments to be described later.

Incidentally, in the system in which an injection apparatus is connected to the injection stretching blow molding machine 1, the setting of 0.00 seconds as the time for the nozzle advancement starting step is frequently adopted.

On the other hand, for example, in order to make the end timings of the injection molding process 62A and the blow molding process 61B coincide with each other, the nozzle advancement starting step 62A4 in the injection molding process 62A is currently controlled to set to, for example, 0.30 seconds, as shown in the illustrated molding flow.

The entire time of a single injection molding process affects the molding cycle X (section X) for the preform 3P.

That is, since the entire time of a single injection molding process depends on a molding cycle of a preform 3P, it affects the production efficiency of hollow molded articles by the injection stretch blow molding machine 1.

The present inventor has focused on a matter where, for example, if the timing of entering the blow mold high-pressure switching step 61B3 (step of increasing a pressure) is set to a timing before the conventional injection mold high-pressure switching step 62A3 is completed, then the timing at which the blowing step 61B4 is started can be made earlier or the time set for the blowing step 61B4 can be certainly extended in performing the time distribution setting for a series of following steps in the blow molding process 61B. As a result, the present inventor has completed the present invention.

In view of the aforementioned problems associated with the conventional technique, the present invention aims at arranging the blow mold high-pressure switching step, in the blow molding process of the injection stretch blow molding machine, at the first half portion of the blow molding process, to shorten the injection molding process and improve the moldability.

Solution to Problem

The present invention has been made in consideration of the aforementioned problems and provides, as a first aspect, a method for producing a hollow molded article using an injection stretch blow molding machine in which a plurality of hollow molded article producing processes are performed simultaneously, the hollow molded article producing process including an injection molding process of injection molding a preform in an injection molding section having an injection molding mold, which includes a combination of an upper mold, a lower mold, and a lip mold, and a blow molding process of blow molding a hollow molded article from the preform in a blow molding section having a blow molding mold, which is a combination of a blow mold and a lip mold. In this method, when the injection molding process in a first hollow molded article producing process among the plurality of hollow molded article producing processes is performed in the injection molding section, the blow molding process in a second hollow molded article producing process prior to the first hollow molded article producing process is performed in the blow molding section; and a blow mold high-pressure switching step during the blow molding process in the second hollow molded article producing process is performed within a time from start of an injection mold opening step during the injection molding process in the first hollow molded article producing process to completion of the injection mold high-pressure switching step, thereby solving the above-mentioned problem.

In the present invention, it is preferable that the blow mold high-pressure switching step during the blow molding process in the second hollow molded article producing process include increasing a mold clamping force for the blow mold that has been closed.

Furthermore, a second aspect of the present invention provides an injection stretch blow molding machine including, on a base plate, an injection molding section having an injection molding mold, which includes a combination of an upper mold, a lower mold, and a lip mold, and a blow molding section having a blow molding mold, which includes a combination of a blow mold and a lip mold, wherein:

the blow molding section includes
  a blowing apparatus including a mold clamping mechanism configured to open and close the blow molding mold, and
  a blowing apparatus positioning stopper configured to press the blowing apparatus laterally in a direction along a mounting surface of the base plate on which the blowing apparatus is mounted, and
the blowing apparatus is positioned so that a lip mold arrangement position in the blow molding mold corresponds to a lip mold lowering position in the blow molding section, thereby solving the above-mentioned problems.

Advantageous Effects of Invention

According to the present invention, the blow mold high-pressure switching step in the blow mold is performed at a timing corresponding to a time from the start of the upper/lower mold opening step for the injection molding mold in the injection molding process to the completion of the injection mold high-pressure switching step for the injection molding mold.

For example, the timing of the blow mold high-pressure switching step is set during the blow molding process so as to correspond to the upper/lower mold opening step during the injection molding process or rotation of the rotary plate.

When doing so, the starting time of a series of the blowing step, blow air exhausting step, blow mold pressure releasing step, and blow mold opening step in the blow molding process can be changed to be shifted to an earlier time.

Then, the end timing of the injection molding process can be made earlier so as to coincide with the end of the blow molding process, for example, it is possible to shorten the nozzle advancement starting step.

Furthermore, in the injection stretch blow molding machine of the present invention, the blowing apparatus can be positioned with high accuracy so that the lip mold arrangement position in the blow molding mold corresponds to the lip mold lowering position in the blow molding section. As a result, compared to the conventional injection stretch blow molding machine, even if the timing of the blow mold high-pressure switching step is set earlier, the preform conveyed from the injection molding section can be properly accommodated in the blow mold.

Shortening of Molding Cycle:

In this way, the time required for the blow molding process can be shortened, and that for the injection molding process can be shortened accordingly. That is, the molding cycle of the preform is shortened, and the efficiency in producing the hollow molded article with the injection stretch blow molding machine is improved.

Improvement of Moldability:

In addition, the blowing step can be extended instead of accelerating the blow mold opening step which is the final step of the blow molding process. Then, by extending the blowing step, the improvement of the shape-imparting properties for molded articles (hollow molded article) and the cooling performance of the molded article are achieved, and thus the moldability of the molded article is improved.

Furthermore, the time from the mold release of the preform to the blowing starting time (the time from the blow mold closing starting step to the blowing step) is shortened, and thus it is possible to provide the advantageous effect of improved moldability because the start of blow molding is possible in a state where the skin layer of the preform is cooler than ever before.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 shows an operation of a conventional blow molding section and includes (a) an explanatory view schematically illustrating stretching and blowing in the blowing step in the blow molding process, and (b) an explanatory view schematically illustrating a blow air exhausting step;

FIG. 10 shows an operation in the blow molding section according to the present invention and includes (a) an explanatory view illustrating a state in which a high-pressure mold clamping force is applied to blow molds, (b) an explanatory view schematically illustrating a state in which a preformed is located above the blow molds, and (c) an explanatory view schematically illustrating a state in which the preform is disposed within a blow molding mold;

DETAILED DESCRIPTION

A description will now be given of an injection stretch blow molding machine 1 for implementing the present invention. The injection stretch blow molding machine 1 includes an injection molding section 3, a blow molding section 4, and an ejection section 5 as in the conventional machine 1. The injection molding section 3 is configured to injection mold a preform, the blow molding section 4 is configured to blow mold, from the preform, a hollow molded article such as a PET bottle and a wide-mouth jar, and the ejection section 5 is configured to eject the hollow molded article to the outside of the machine 1.

The injection stretch blow molding machine 1 includes a rotary plate with three positions where three lip molds are arranged to correspond to the injection molding section 3, the blow molding section 4, and the ejection section 5, respectively. The rotary plate repeatedly rotates at a constant rotation angle while descending and ascending, so that the preform is transferred from the injection molding section 3 to the blow molding section 4 with the lip mold, so that the hollow molded article is transferred from the blow molding section 4 to the ejection section 5, and so that the lip mold releases the hollow molded article in the ejection section 5. Alto, the rotary plate moves the lip mold, which has released the hollow molded article, to the injection molding section 3 by the rotation thereof.

The injection stretch blow molding machine 1 has the same basic configuration as that in the conventional injection stretch blow molding machine 1 in that the injection molding section 3, the blow molding section 4, and the ejection section 5 are arranged at equal angular intervals, and the lip molds move in accordance with the rotation of the rotary plate while corresponding to the injection molding section 3, the blow molding section 4, and the ejection section 5 in this order.

Furthermore, the injection stretch blow molding machine 1 also has the same basic configuration as that in the conventional injection stretch blow molding machine 1 in that in the injection molding section 3, the lip mold is combined with the upper mold and the lower mold to configure an injection molding mold, and in the blow molding section 4, the lip mold is combined with the pair of blow molds to configure a blow molding mold.

Figure 1:
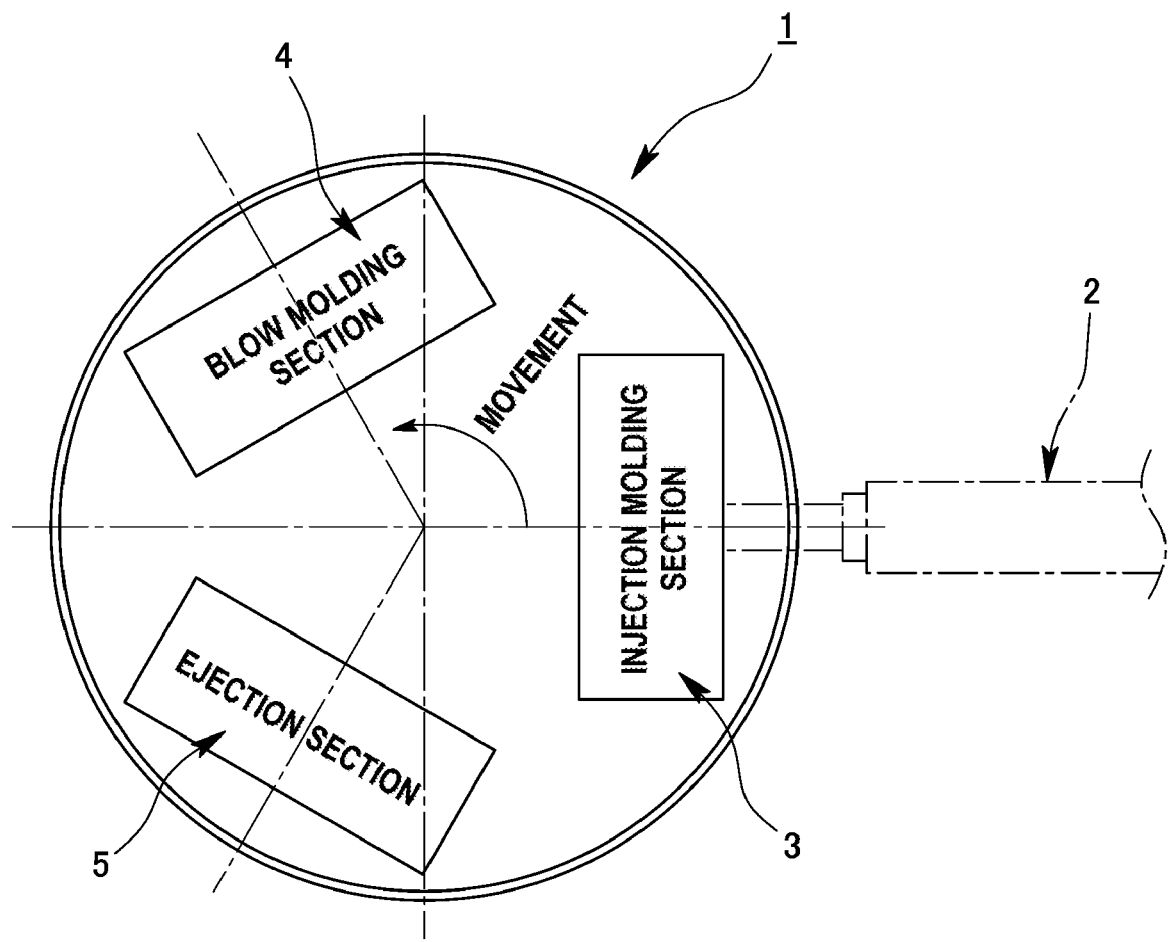
FIG. 1 is an explanatory view schematically illustrating an injection molding section, a blow molding section, and an ejection section of an injection stretch blow molding machine.
Figure 2:
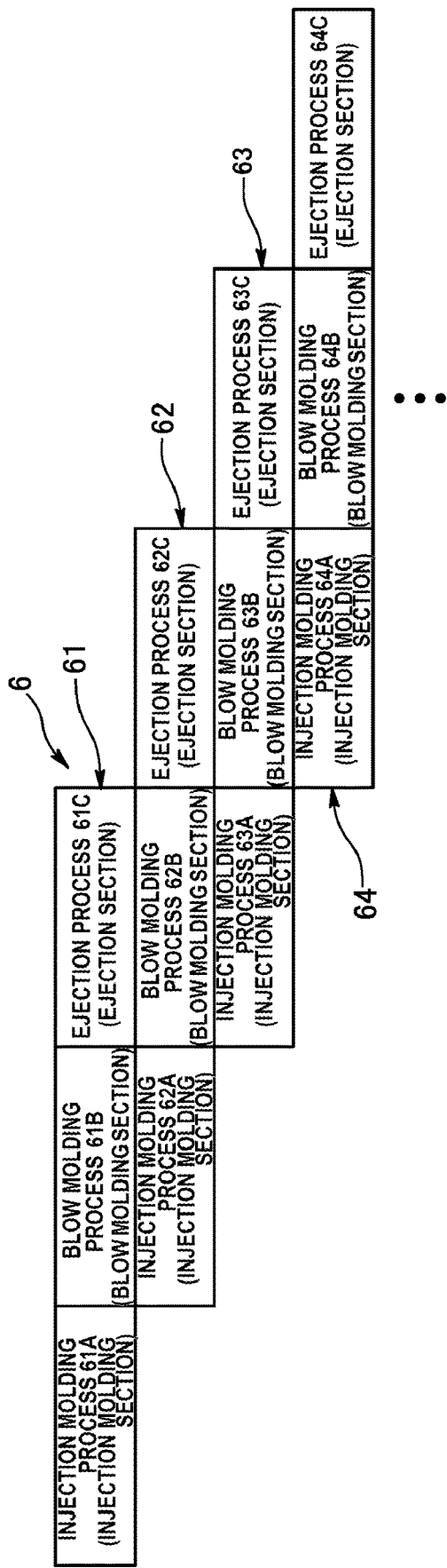
FIG. 2 is an explanatory view schematically illustrating a plurality of hollow molded article producing processes simultaneously performed in the injection stretch blow molding machine.

The injection stretch blow molding machine 1 according to the present invention performs, as in the same manner as the conventional one illustrated in FIG. 2, an injection molding process 61A (62A, 63A, 64A, ... ), in which a preform is injection molded, and a blow molding process 61B (62B, 63B, 64B, ... ), in which a hollow molded article is blow molded by stretching and blowing the preform obtained in the injection molding process 61A (62A, 63A, 64A, ... ). The injection molding process 61A (62A, 63A, 64A, ... ) and the blow molding process 61B (62B, 63B, 64B, ... ) are continuously performed, so that the molding of hollow molded articles is made continuous with the molding of preforms. In addition to these, an ejection process 61C (62C, 63C, 64C, ... ), in which the hollow molded article is ejected from the ejection section 5 to the outside of the molding machine, is also made continuous therewith.

Accordingly, the injection stretch blow molding machine 1 performs a hollow molded article producing process 6 (61, 62, 63, 64, ... ) for producing a hollow molded article by sequentially performing the injection molding process 61A (62A, 63A, 64A, ... ), the blow molding process 61B (62B, 63B, 64B, ... ), and the ejection process 61C (62C, 63C, 64C, ... ).

In order to continuously repeat the hollow molded article producing process 6, the injection molding process is repeatedly performed as 61A, 62A, 63A, 64A, ... , the blow molding process is repeatedly performed as 61B, 62B, 63B, 64B, . . . , and the ejection process is repeatedly performed as 61C, 62C, 63C, 64C.

Figure 8:
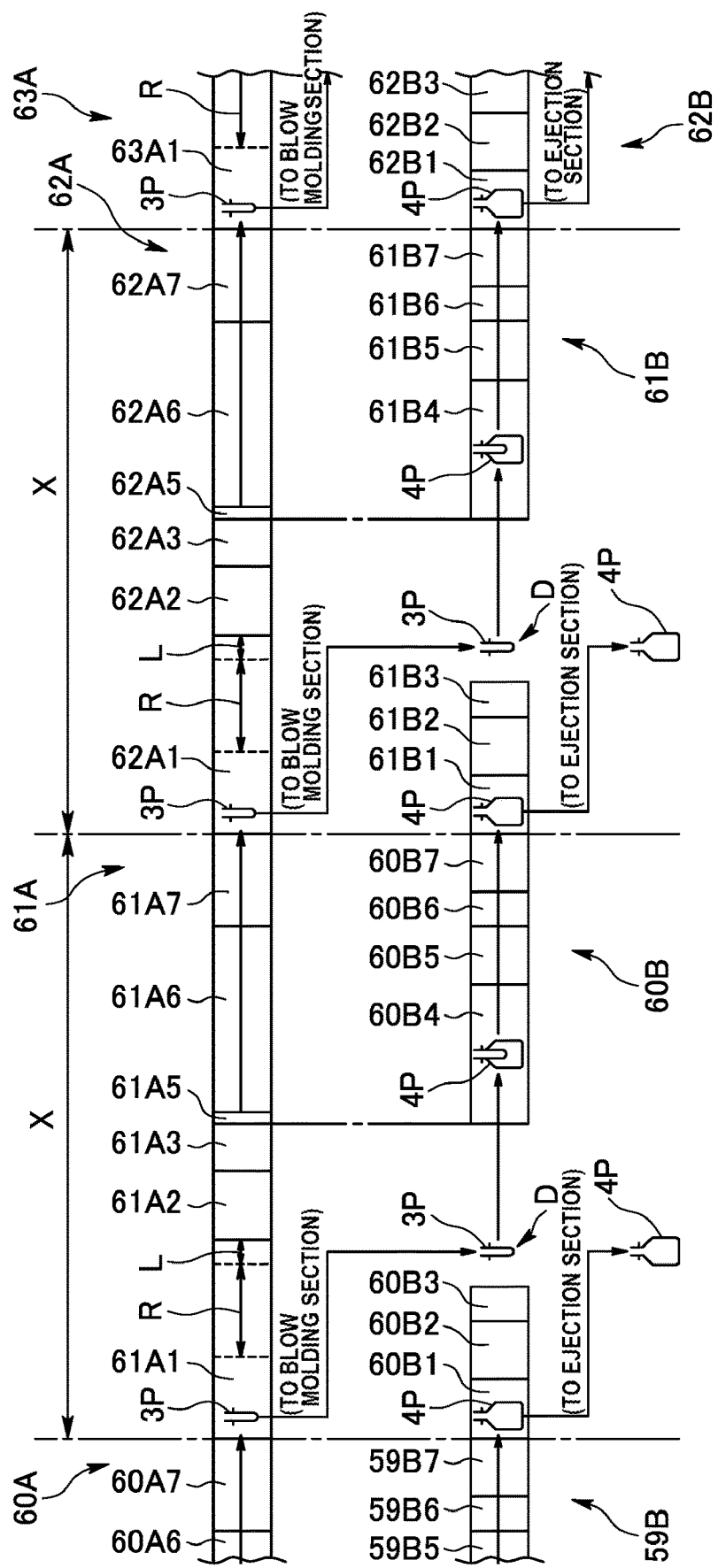
FIG. 8 is an explanatory view illustrating a molding flow including an injection molding process and a blow molding process in a first embodiment of the present invention.
Figure 9:
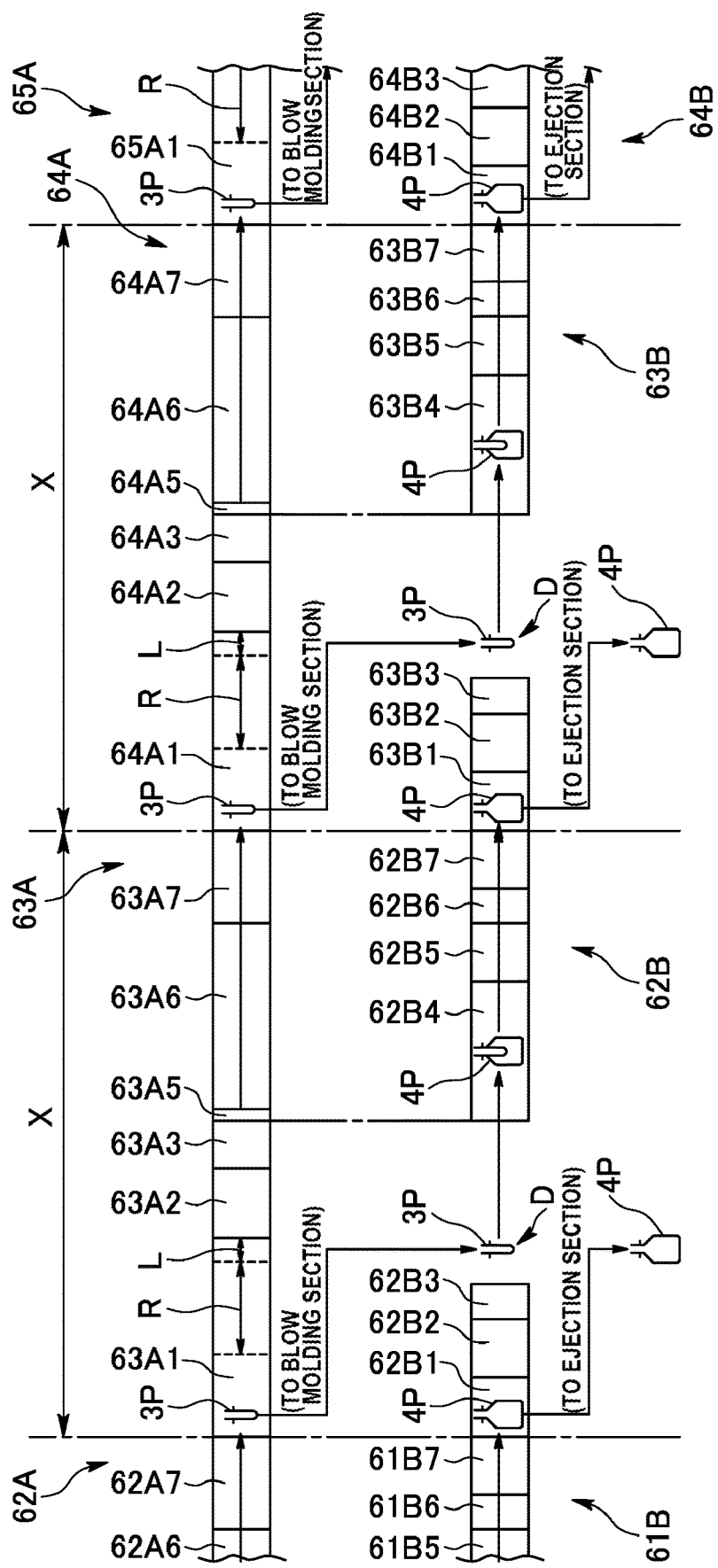
FIG. 9 is an explanatory view illustrating a molding flow including an injection molding process and a blow molding process also in the first embodiment of the present invention.

Furthermore, when the injection molding process 62A is focused on as one step of injection molding a preform 3P in the injection molding section 3, the injection molding process 62A and the blow molding process 61B of blow molding a hollow molded article 4P in the blow molding section 4 are simultaneously performed as in the conventional technique and as shown in FIGS. 8 and 9. Although not illustrated, the ejection process is also performed simultaneously.

In the injection stretch blow molding machine 1, as described above, the injection molding section 3, the blow molding section 4, and the ejection section 5 are disposed at equal angular intervals, and the three lip molds move while corresponding to positions different from one another. Thus, the three hollow molded article producing processes 6 as described with reference to FIG. 2 in the conventional example are performed while being shifted one stage behind the preceding process (by the amount corresponding to the preform molding cycle), so that the hollow molded articles are produced by each hollow molded article producing process 6.

FIGS. 8 and 9 show a state in which each of the injection molding process and the blow molding process is repeatedly performed.

For example, assuming that the injection molding process 62A and the blow molding process 61B are currently performed, the previous (preceding) process relative to the injection molding process 62A is shown as being denoted by 61A, and the previous (preceding) process relative to the blow molding process 61B is shown as being denoted by 60B.

In addition, the next (following) process relative to the injection molding process 62A is denoted by 63A, and the next (following) process relative to the blow molding process 61B is denoted by 62B.

That is, when the hollow molded article producing process 62, which is one process in the injection stretch blow molding machine 1, is defined as a first hollow molded article producing process, the injection molding process 62A, in which the preform 3P is injection molded in the injection molding section 3 in the first hollow molded article producing process (hollow molded article producing process 62), and the blow molding process 61B, in which the blow molding section 4 receives the preform 3P injection molded in the injection molding process 61A of a second hollow molded article producing process (hollow molded article producing process 61), which is the preceding process relative to the first hollow molded article producing process (hollow molded article producing process 62), and in which the hollow molded article 4P is blow molded from the preform 3P, are performed simultaneously.

FIGS. 8 and 9 show that the injection molding processes 61A, 62A, 63A, 64A are sequentially performed, and the blow molding processes 60B, 61B, 62B, 63B are sequentially performed.

As will be described repeatedly, in FIGS. 8 and 9, the movement of the preform 3P (conveyance) and the movement of the hollow molded article 4P (conveyance) are also illustrated. How to transfer the molded preform 3P and hollow molded article 4P is that the preform 3P molded in the injection molding process 61A as the preceding process, which has just been performed, is transferred to the blow molding section 4 in the current blow molding process 61B.

The preformed 3P molded in the current injection molding process 62A is transferred to the blow molding section 4 in the blow molding process 62B as the following process in the hollow molded article producing process 62.

Furthermore, the hollow molded article 4P blow molded in the blow molding process 60B as the preceding process, which has been performed, is transferred to the ejection section 5 of the current ejection process (not illustrated).

The hollow molded article 4P to be blow molded in the current blow molding process 61B is transferred to the ejection section 5 of the ejection process (not illustrated) as the following process in the hollow molded article producing process 61.

In the present invention, the configuration of the steps in the injection molding process 61A, 62A, 63A, 64A, . . . and the blow molding process 61B, 62B, 63B, 64B, . . . in the hollow molded article producing processes 61, 62, 63, 64, . . . are different from those in the conventional example. FIGS. 8 and 9 show a molding flow in the first embodiment.

Since the injection molding processes 61A, 62A, 63A, 64A, . . . are sequentially performed, the configuration thereof will be described below with reference to only the injection molding process 62A which is currently performed. Similarly, since the blow molding processes 61B, 62B, 63B, 64B, . . . are also sequentially performed, the configuration thereof will be described with reference to only the blow molding process 61B which is currently performed.

First Embodiment

Injection Molding Process 62A:
In the first embodiment illustrated in FIGS. 8 and 9, firstly, the configuration of the injection molding process 62A in the hollow molded article producing process 62 as the first hollow molded article producing process is different from the configuration of the injection molding process 62A of the conventional example described above (with reference to FIGS. 3 and 4).
The injection molding process 62A in this first embodiment (injection molding process currently performed) includes an upper/lower mold opening step 62A1, an upper/lower mold clamping step 62A2, an injection mold high-pressure switching step 62A3, an injection starting step 62A5, an injecting step 62A6, and a cooling step 62A7.
Upper/Lower Mold Opening Step 62A1:
In the upper/lower mold opening step 62A1 as a first step, the mold clamping force applied to the injection molding mold, which has been closed in the final stage of the injection molding process 61A, which has been performed in the preceding process, is released, so that the preform 3P (the preform molded in the preceding injection molding process 61A) is released by the acceding action of the rotary plate while opening the upper mold and the lower mold.
Then, in the upper/lower mold opening step 62A1, the upper mold and the lower mold are kept open in order to incorporate the lip mold that does not support any preform.
The operation of the upper/lower mold opening step 62A1 itself is the same as that of the conventional technique.
Rotation R:
As the operation of the rotary plate, after the preform has been released and the rotary plate has ascended and reached a predetermined height position, the rotary plate rotates at a constant rotation angle. In FIGS. 8 and 9, as in the case of the conventional example, a portion corresponding to this rotation is denoted by R, and the range is indicated by an arrow.

The rotation R is to be performed during the upper/lower mold opening step 62A1, and also performed after the rotary plate has reached a certain height position of a predetermined height.

In the injection stretch blow molding machine 1, the operation at this time of rotation is, as specifically described in the conventional example, a movement of transferring a preform 3P molded in the injection molding process 61A of the preceding process and the lip mold supporting the preform 3P from the injection molding section 3 to a position above a position where the blow molding mold is assembled in the blow molding section 4, and stopping them.

Similarly, the operation is also a movement of transferring the lip mold and a hollow molded article 4P (the hollow molded article molded in the blow molding process 60B of the preceding process) from the blow molding section 4 to the ejection section 5 and stopping them at a predetermined height position in the ejection section 5.

Similarly, the operation is also a movement of transferring the lip mold that has released the hollow molded article in the ejection section 5 to the injection molding section 3, and stopping it above the position where the injection molding mold is assembled.

Rotation Lock L:

Furthermore, the rotation lock L is performed as the operation for the rotary plate continuously performed from above, to temporarily lock the rotation of the rotary plate by a rotary lock member during the upper/lower mold opening step 62A1 after the rotary plate has finished the rotation by the constant rotation angle.

In the drawing, a portion corresponding to this operation is denoted by L, and the range thereof is indicated by an arrow.

The rotation lock L is performed subsequently to the rotation R.

Thus, the upper/lower mold opening step 62A1 in the drawing is shown to include a time for the rotary plate (not shown) that includes a lip mold for supporting the preform 3P to rotate at a predetermined rotation angle)(120°) as in the conventional example, and a time for locking the rotation of the rotary plate.

Upper/Lower Mold Clamping Step 62A2:

Upon completion of the stage of the rotation lock L in the upper/lower mold opening step 62A1 described above, the upper/lower mold clamping step 62A2 is subsequently performed.

As described above, the upper/lower mold clamping step 62A2 is a step of overlaying the lip mold on the lower mold, and inserting the upper mold from above through the lip mold to the lower mold to close the molds. The mold clamping force at this step is a relatively low pressure.

Injection Mold High-Pressure Switching Step 62A3:

The injection molding process 62A in the first embodiment includes the injection mold high-pressure switching step 62A3 performed continuously with the upper/lower mold clamping step 62A2 which has been previously performed.

Figure 3:
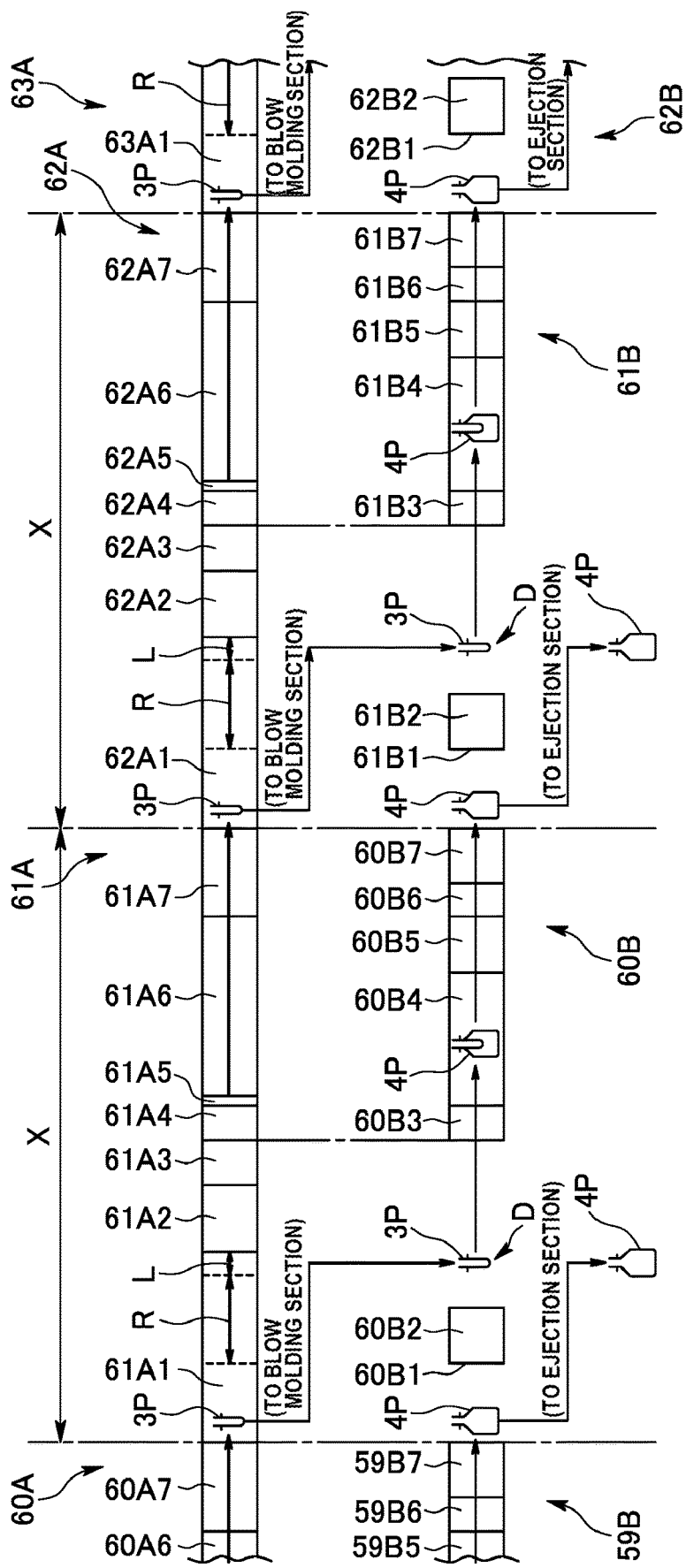
FIG. 3 is an explanatory view illustrating a molding flow including an injection molding process and a blow molding process in a conventional technique.
Figure 4:
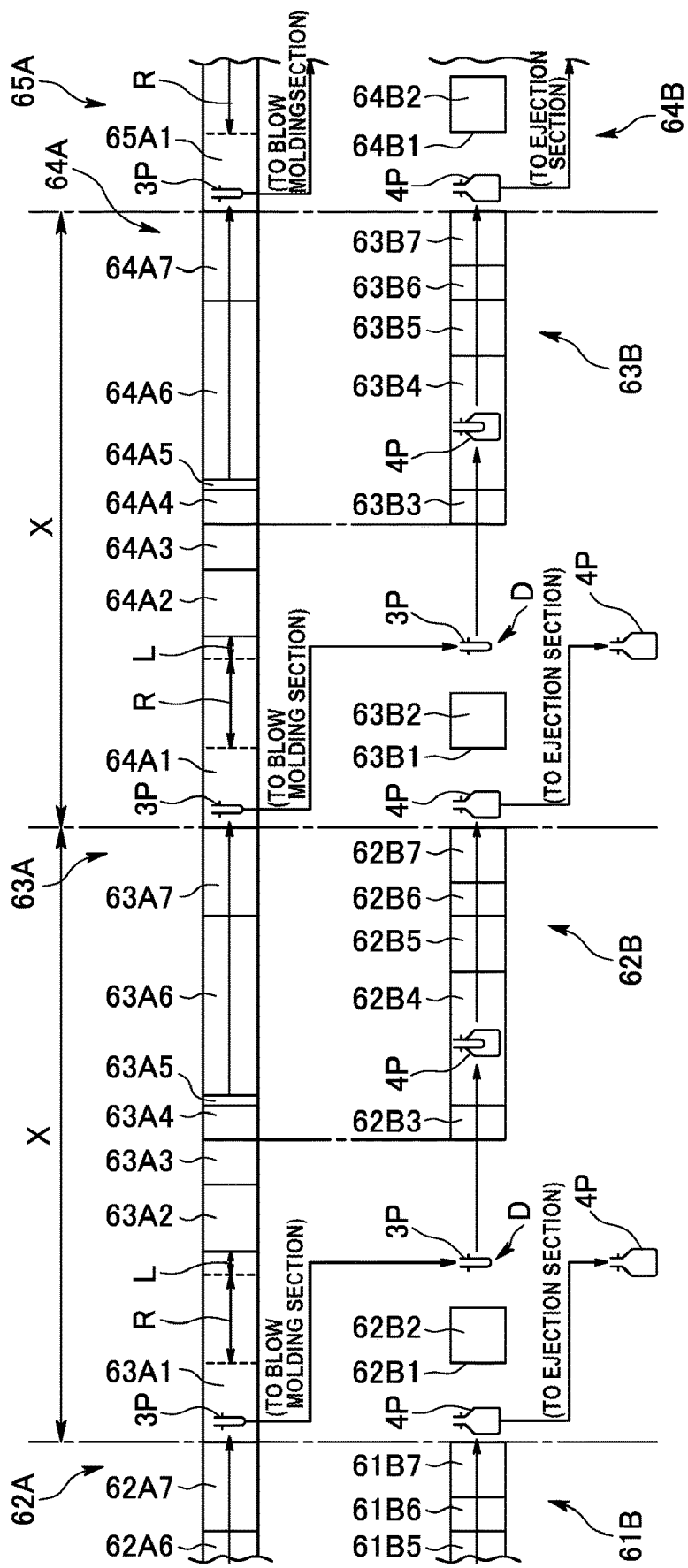
FIG. 4 is an explanatory view illustrating a molding flow including an injection molding process and a blow molding process in a conventional technique.

As in the conventional example illustrated in FIGS. 3 and 4, the injection mold high-pressure switching step 62A3 in the present embodiment is a step of increasing the mold clamping force in the injection molding mold from the relatively low pressure, and also is performed continuously with the upper/lower mold clamping step 62A2.

Incidentally, even after the injection mold high-pressure switching step 62A3 has been completed, the high-pressure mold clamping force is maintained until the cooling step 62A7 is completed as in the conventional example.

Injection Starting Step 62A5:

In the injection molding process 62A according to the first embodiment, the injection mold high-pressure switching step 62A3 is followed by the injection starting step 62A5.

This injection starting step 62A5 is a step of controlling the injection start timing when injecting a molten resin. The operation itself in this step is the same as that in the conventional example.

Injecting Step 62A6:

The next step is the injecting step 62A6 performed continuously with the injection starting step 62A5. The injecting step 62A6 is a step of filling the molten resin and holding the injection pressure. The time of the step varies depending on the size, shape, and other factors of the preform to be injection molded. The operation itself in this step is the same as that in the conventional example.

Cooling Step 62A7:

In the first embodiment, the injecting step 62A6 is followed by the cooling step 62A7. During the injection molding process 62A, the cooling step 62A7 cools the preform 3P, which has been formed of the injected molten resin, in the injection molding mold through which a cooling medium is passed.

In the injection stretch blow molding machine 1 that implements the present invention, the time for cooling the preform 3P in the cooling step 62A7 is not set to a time until both the surface layer (skin layer) and the inner layer (core layer) of the preform 3P are completely solidified.

More specifically, the cooling time is set to a time during which a timing of releasing the preform can be accelerated while securing a certain degree of hardness of the surface layer of the preform 3P.

Differences from the Conventional Technique:

As discussed above, the conventional injection molding process 62A (see FIG. 3) includes the nozzle advancement starting step 62A4 performed continuously with the injection mold high-pressure switching step 62A3, and the injection starting step 62A5 performed continuously with the nozzle advancement starting step 62A4.

On the other hand, the above-described injection molding process 62A of the first embodiment is different from the conventional injection molding process 62A in that the injection starting step 62A5 is performed continuously with the injection mold high-pressure switching step 62A3.

More specifically, in the first embodiment, the time that has been set for the nozzle advancement starting step 62A4 in the injection molding process 62A of the conventional example (for example, the previously set time was 0.30 seconds as in the conventional example) to 0.00 seconds as described later. Thus, the time taken for the nozzle advancement starting step 62A4 is omitted so that the nozzle (injection apparatus) advancement start timing and the injection starting step 62A5 are performed at the same timing.

Reason for omitting the nozzle advancement starting step 62A4:

The first embodiment does not simply omit the nozzle advancement starting step 62A4.

As will be described later, the present invention can advance the timing at which the final step of the blow molding process 61B is completed. The timing of completion of the final step of the injection molding process 62A is advanced to coincide with the timing of completion of the blow molding process 61B that has been advanced.

In order to accelerate the completion of the final step of the injection molding process 62A, the time for the nozzle advancement starting step 62A4 is omitted.

Therefore, the period X (section X) in the injection molding process 62A, to be described later, is considerably shortened, so that the molding cycle of the preform is shortened.

Blow Molding Process 61B:

Next, the blow molding process 61B in the first embodiment (the blow molding process in the hollow molded article producing process 61 as the second hollow molded article producing process performed in the blow molding section 4, i.e., the blow molding process currently performed) includes the blow mold closing starting step 61B1, the blow mold quick operation step 61B2, the blow mold high-pressure switching step 61B3, the blowing step 61B4, the blow air exhausting step 61B5, the blow mold pressure releasing step 61B6, and the blow mold opening step 61B7 steps as in the conventional example described above.

Blow Mold Closing Starting Step 61B1:

As described in the conventional example, the final step (blow mold opening step) of the blow molding process 60B of the preceding process has been completed, and the pair of blow molds has been opened so that the hollow molded article 4P can be released upward.

During the subsequent blow mold closing starting step 61B1 of the blow molding process 61B, the rotary plate ascends and the hollow molded article 4P supported by the lip mold is released and moves upward from the blow mold.

Then, after the hollow molded article 4P molded in the blow molding process 60B of the preceding process has been released from the blow mold, the mold closing operation is started so as to bring the pair of blow molds closer to each other in the blow mold closing starting step 61B1.

Needless to say, the operation of the blow mold closing starting step 61B1 itself is the same as that in the conventional example, and the same is true in that the lip mold moves the hollow molded article 4P that has been molded and released in the preceding process to transfer it to the ejection section 5.

In the conventional blow molding process 61B, the time of the blow mold closing starting step 61B1 is set to 0.00 sec, so that the timing of closing the blow molds is controlled to coincide with the timing of the blow mold quick operation step 61B2, and the time related to the blow mold closing starting step 61B1 is not set independently.

Figure 5A:
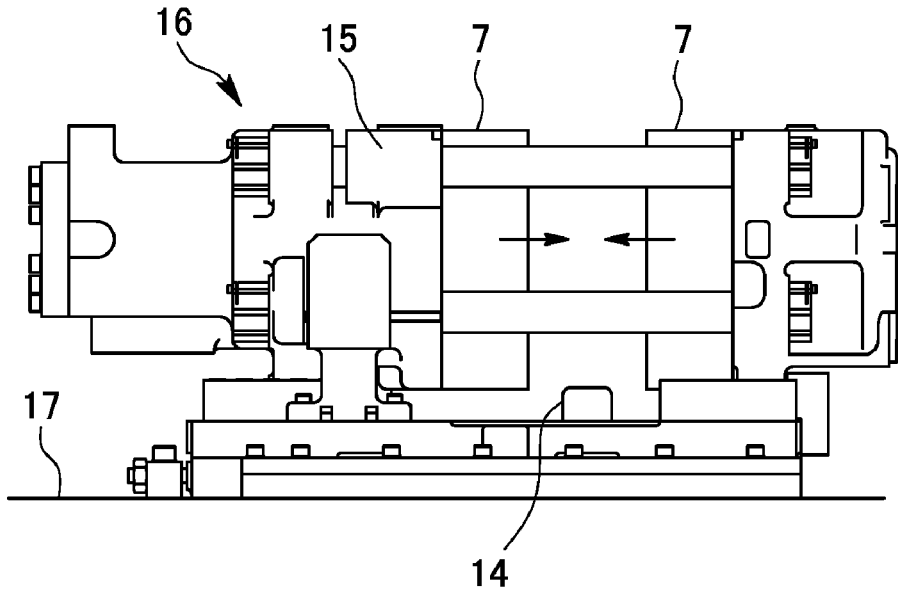
FIG. 5 shows a blow mold quick operation step in a conventional blow molding process and includes (a) an explanatory view illustrating a state in which blow molds as a pair are approaching each other and (b) an explanatory view illustrating a state in which the pair of blow molds is closed with the low-pressure mold clamping force applied thereto.
Figure 5B:
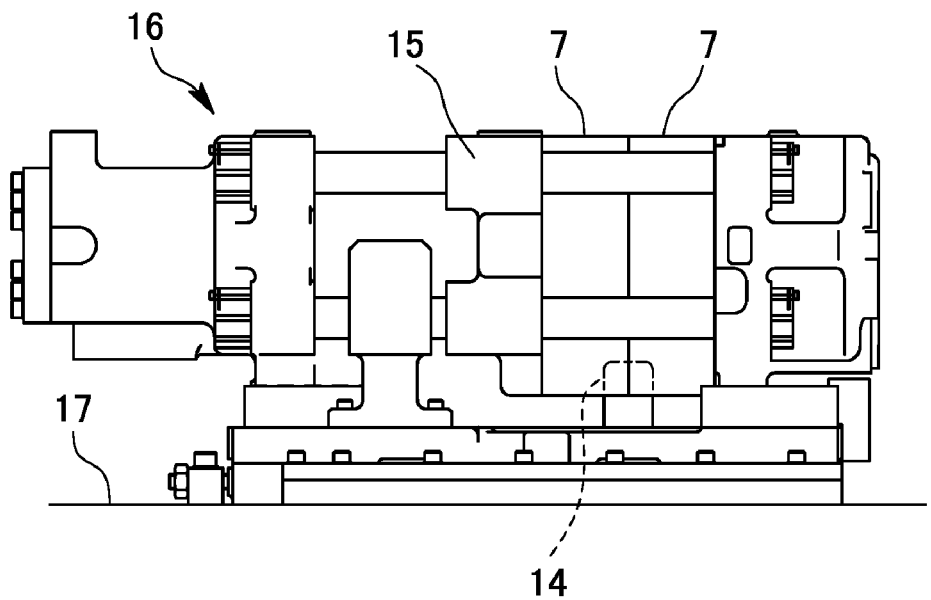
Figure 6:
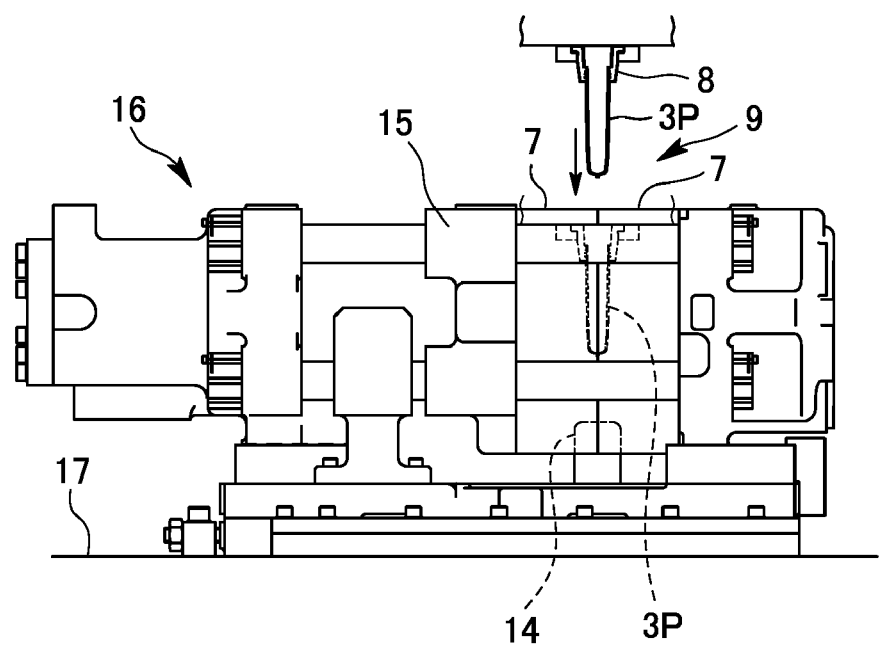
FIG. 6 is an explanatory view illustrating a state where a preform is disposed within the pair of blow molds closed in the conventional blow molding section.

Blow Mold Quick Operation Step 61B2:

Next, the blow molding process 61B of the first embodiment includes the blow mold quick operation step 61B2 subsequent to the blow mold closing starting step 61B1. In this step, the closing operation of the mold is performed under a state of applying a low-pressure mold clamping force to the blow molds (see FIG. 5 of the conventional example).

During this step, the upper/lower mold opening step 62A1 is also performed in the injection molding process 62A. In this case, since the preform 3P and the hollow molded article 4P which move with the rotation of the rotary plate do not interfere with the movement of the closing blow molds, the blow mold quick operation step 61B2 may be performed during the rotation of the rotary plate (at the time of rotation R).

Blow Mold High-Pressure Switching Step 61B3:

Following the blow mold quick operation step 61B2, the blow mold high-pressure switching step 61B3 is provided continuously. That is, the start timing of the blow mold high-pressure switching step 61B3 is set prior to that in the conventional technique.

This point is greatly different from the configuration of the blow molding process 61B of the conventional technique illustrated in FIGS. 3 and 4.

The conventional blow mold high-pressure switching step 61B3 illustrated in FIGS. 3 and 4 is provided to be performed subsequently from the completion of the injection mold high-pressure switching step 62A3, which is performed for the injection molding mold in which the lip mold is introduced.

On the contrary, the blow mold high-pressure switching step 61B3 of the present embodiment is provided to be performed before the injection mold high-pressure switching step 62A3 so as not to overlap with the injection mold high-pressure switching step 62A3.

Furthermore, as illustrated in FIGS. 8 and 9, the blow mold high-pressure switching step 61B3 is set to a timing prior to the rotation lock L in the injection molding process 62A as well as prior to the timing at which the preform 3P is disposed inside the blow mold so as to be continuous with the blow mold quick operation step 61B2 described above.

The blow mold high-pressure switching step 61B3 in the blow molding process 61B is also a step of increasing the mold clamping force applied to the pair of blow molds.

Maintaining of High-Pressure Mold Clamping Force—Check Valve:

The mold clamping force that has been increased to a predetermined high pressure through the blow mold high-pressure switching step 61B3 is maintained until the blow mold pressure releasing step 61B6 is started.

Then, in order to maintain the high-pressure clamping of the blow mold from the end of the blow mold high-pressure switching step 61B3 to the start of the blow mold pressure releasing step 61B6, the present embodiment further includes a check valve added to a mold closing hydraulic circuit in the injection stretch blow molding machine 1. With the check valve, the high pressure in the mold clamping hydraulic circuit is maintained until the blow mold pressure releasing step 61B6 is started after the blow mold high-pressure switching B3 has been completed.

As shown in FIGS. 3 and 4, in the conventional example, at the timing at which the injection mold high-pressure switching step 62A3 of the injection molding process 62A is completed, the blow mold high-pressure switching step 61B3 is started, so that the operation of varying the mold clamping force for the injection mold does not affect the pressure circuit that holds the mold clamping force for the blow mold at a high pressure.

On the other hand, in this first embodiment, after the blow mold high-pressure switching step 61B3 has been completed, the injection mold high-pressure switching step 62A3 is performed in the injection molding process 62A.

Thus, the operation of increasing a pressure on a pressure device side to achieve the high-pressure mold clamping force for the injection mold may affect the hydraulic circuit for use in clamping the blow molds with a high-pressure mold clamping force.

Therefore, a check valve is added to the mold closing hydraulic circuit to maintain the pressure of the mold clamping hydraulic circuit at a high pressure for a certain period of time from the end of the blow mold high-pressure switching step 61B3 to the start of the blow mold pressure releasing step 61B6.

FIG. 10 shows the blow molding section 4 according to the present invention. FIG. 10(a) illustrates the blow mold high-pressure switching step 61B3, schematically representing a situation where a high-pressure mold clamping force 13 is applied to the pair of closed blow molds 7.

Since the pair of blow molds 7 at this point of time is in a state of being mold-closed, an opening for receiving a preform is formed on the upper surface side of the blow molds 7 as described in the conventional example. Also, a portion where the lip mold 8 is placed is also formed.

FIG. 10(b) shows a situation where the preform 3P and the lip mold 8 that supports the preform 3P are positioned above the blow molding section 4 where a predetermined high-pressure mold clamping force 13 is applied to the blow molds 7.

Furthermore, FIG. 10(c) shows a situation where the lip mold 8 by the descending action of the rotary plate is overlaid on the blow molds 7 in the high-pressure clamping state to form the blow molding mold 9, and the preform 3P is disposed there inside.

FIGS. 10(b) and (c) show the operation at the time indicated by the arrow D in the blow molding process 61B, 62B, 63B of FIGS. 8 and 9.

Blowing apparatus positioning stopper:
In the blow molding section 4 that implements the present invention as described above, the blow mold high-pressure switching step 61B3 is performed prior to the placement of the preform 3P inside the pair of blow molds 7, and the preform is lowered by passing the preform 3P through the opening of the upper surface of the pair of blow molds 7, which has been in the mold-clamping state with a high-pressure mold clamping force.

Then, the machine is configured so that the lowering preform 3P and the blow molds 7 do not interfere with each other, and so that the lip mold 8 overlaps at an appropriate position in the pair of blow molds 7 in the mold clamping state.

Therefore, the blowing apparatus 16 including the pair of blow molds 7, a bottom mold 14, a clamping mechanism 15, and the like must be precisely mounted in place on the base plate 17 of the injection stretch blow molding machine 1.

In view of the circumstance, the blow molding section 4 includes a blowing apparatus positioning stopper 18 as shown in FIG. 10. The blowing apparatus positioning stopper 18 can accurately position the blowing apparatus 16 relative to the base plate 17.

Figure 13:
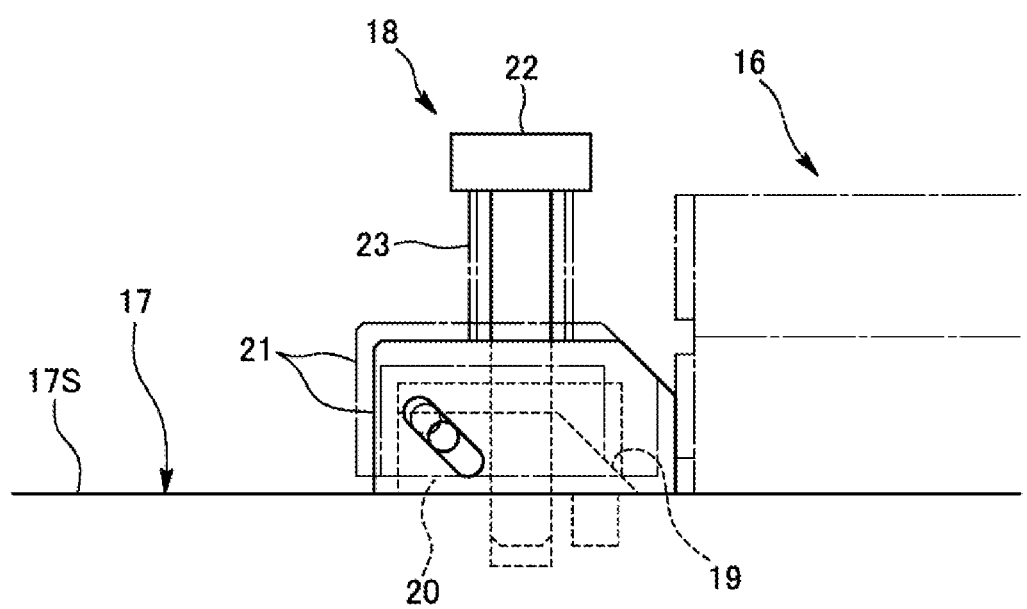
FIG. 13 is an explanatory view schematically illustrating a blowing apparatus positioning stopper.
Figure 14:
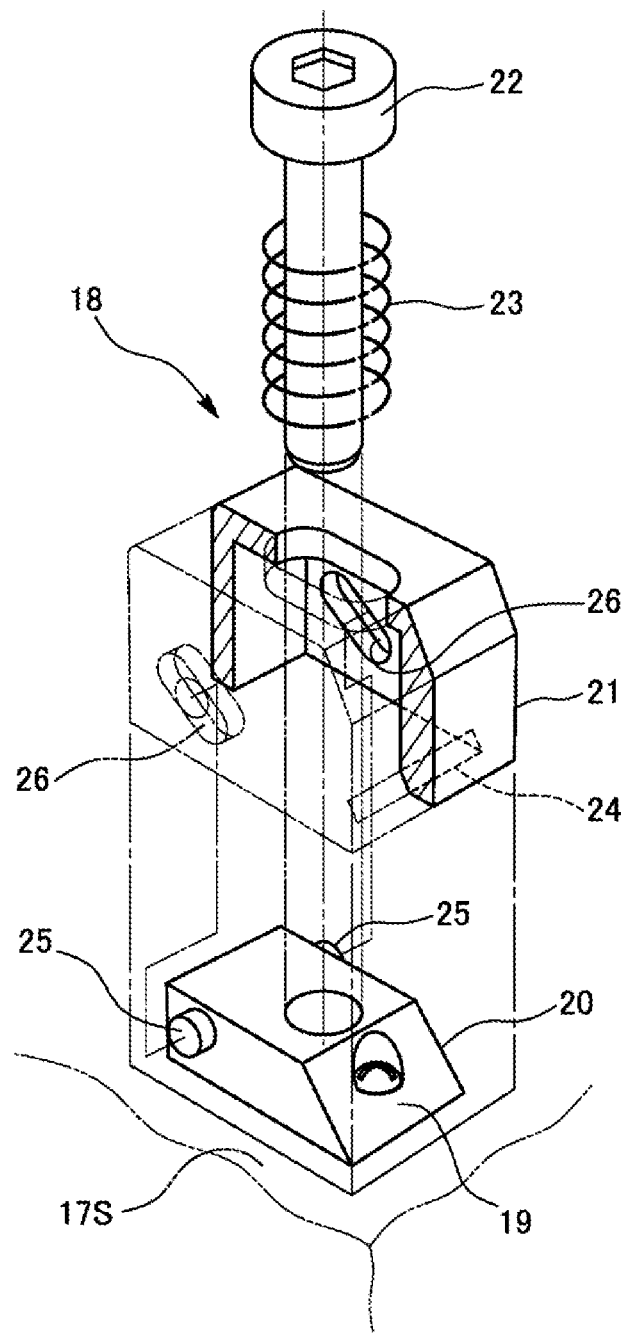
FIG. 14 is an explanatory view illustrating a perspective exploded state of the blowing apparatus positioning stopper.

FIGS. 13 and 14 illustrates the blowing apparatus positioning stopper 18. The blowing apparatus positioning stopper 18 includes a fixed body 20 that has an inclined surface 19, which is inclined with respect to the vertical direction, at the end portion thereof as illustrated in the drawings, a pressing body 21 that is to be overlaid on the fixed body 20 while being capable of moving in the vertical direction, and is configured to be pushed in the lateral direction (a direction along a mounting surface 17S on which the blowing apparatus 16 and the like are mounted) while being guided along the inclined surface 19 to be lowered, an adjustment screw 22 that is screwed to the base plate 17 through the fixed body 20 and the pressing body 21, and a spring 23 that is positioned between the pressing body 21 and a head of the adjustment screw 22 and is configured to press the pressing body 21 by a pushing force that is derived from the descending action of the adjustment screw 22.

The blowing apparatus positioning stopper 18 is disposed at a position near the bottom of the blowing apparatus 16 disposed on the base plate 17. The adjustment screw 22 is configured to apply a pressure from above to the pressing body 21 when the adjustment screw 22 is operated to screw the base plate 17. Furthermore, the receiving surface 24 of the pressing body 21 is guided to the inclined surface 19 of the fixed body 20 by the applied pressure. Furthermore, the pressing body 21 has a long hole 26 which is inclined at the same inclination angle as the inclined surface 19, and the fixed body 20 has a boss 25 which projects on the side surface of the fixed body 20 and is fitted to the long hole 26 so as to be movable therealong. Thus, the pressing body 21 is guided by the boss 25 along the long hole 26 to move laterally, and as a result, the pressing body 21 comes into contact with the bottom portion of the blowing apparatus 16 to press the blowing apparatus 16 in a direction along the mounting surface 17S.

In the injection stretch blow molding machine 1 that implements the present invention, the positioning of the blowing apparatus 16 is performed with high accuracy by adjusting the position with the blowing apparatus positioning stopper 18 so that the lip mold arrangement portion formed when the blow molds 7 are closed coincides with the lowering position of the lip mold 8. Consequently, the preform 3P conveyed from the injection molding section 3 to the opening of the closed blow molds 7 can be inserted without interfering with the blow molds 7. Thus, compared to the conventional injection stretch blow molding machine, even if the timing of the blow mold high-pressure switching step 61B3 is set in earlier point, the preform 3P conveyed from the injection molding section 3 can be properly accommodated in the blow molds 7.

Blowing Step 61B4:
The blowing step 61B4 of the present embodiment is a step of performing blow molding by stretching and air blowing (see FIG. 7(a)).

Although the operation in the blowing step 61B4 itself is the same as the operation of the blowing step 61B4 of the conventional example, the timing for starting this step is different from the conventional example. In the present embodiment, the start timing of the blowing step 61B4 is set to a timing coinciding with the timing at which the injection mold high-pressure switching step 62A3 of the injection molding process 62A is completed.

Therefore, the timing for starting the blowing step 61B4 in the blow molding process 61B is an early stage compared to the conventional blow molding process 61B.

Blow Air Exhausting Step 61B5:
When the blowing step 61B4 is completed, the blow air exhausting step 61B5 follows. In the blow air exhausting step 61B5, the blow air supplied into the inside of the blow molding mold is released. This step is the same as the blow air exhausting step 61B5 in the conventional example (FIG. 7(b)).

Blow mold pressure releasing step 61B6:
The blow mold pressure releasing step 61B6 performed next is a step of releasing the mold clamping force applied to the pair of closed blow molds. This step is the same as the blow mold pressure releasing step 61B6 in the conventional example.

Blow Mold Opening Step 61B7:

The blow mold opening step 61B7 performed next is a step of opening the pair of closed blow molds. This step is the same as the blow mold opening step 61B7 in the conventional example.

As described above, the blowing step 61B4 is started earlier than the blow molding process 61B of the conventional example. In the first embodiment, as shown in FIGS. 8 and 9, the blowing step 61B4, the blow air exhausting step 61B5, the blow mold pressure releasing step 61B6, and the blow mold opening step 61B7 are continuous in series.

The time periods for the blowing step 61B4, blow air exhausting step 61B5, blow mold pressure releasing step 61B6, blow mold opening step 61B7 during the blow molding process 61B are also the same as those in the conventional example. Therefore, in the first embodiment, the timing at which the blow mold opening step 61B7 of the blow molding step B is completed is also advanced.

The timing at which the final step of the injection molding process 62A is completed is the same as the timing at which the final step of the accelerated blow molding process 61B is completed. Specifically, the time required for the operation of the nozzle advancement starting step 62A4 in the injection molding process 62A as described above is set to 0.00 seconds in order to make the timing at which the final step of the injection molding process 62A is completed coincide with that at which the final step of the blow molding process 61B is completed.

That is, the timing of the nozzle advancement start step is controlled to coincide with the timing of the injection starting step 62A5 to omit the nozzle advancement starting step 62A4.

In the first embodiment, the blow mold high-pressure switching step 61B3 is performed continuously with the blow mold quick operation step 61B2 to advance the timing of the blow mold high-pressure switching step 61B3, thereby shortening the blow molding step B.

Thus, the nozzle advancement starting step 62A4 during the injection molding process 62A is omitted to shorten the injection molding process 62A, resulting in shortening the molding cycle of the preform, and improving the production efficiency of the hollow molded article.

Second Embodiment

Next, a second embodiment will be described. The second embodiment is the same as the first embodiment in that the blow mold high-pressure switching step 61B3 is started while being continuous with the completion of the blow mold quick operation step 61B2 during the blow molding process 61B.

Then, the second embodiment is different from the first embodiment in that the injection molding process 62A, as described below, is configured to set an independent operation time in the nozzle advancement starting step 62A4, and in that the blow molding process 61B is changed so that the time to be set in the blowing step 61B4 is changed.

Figure 11:
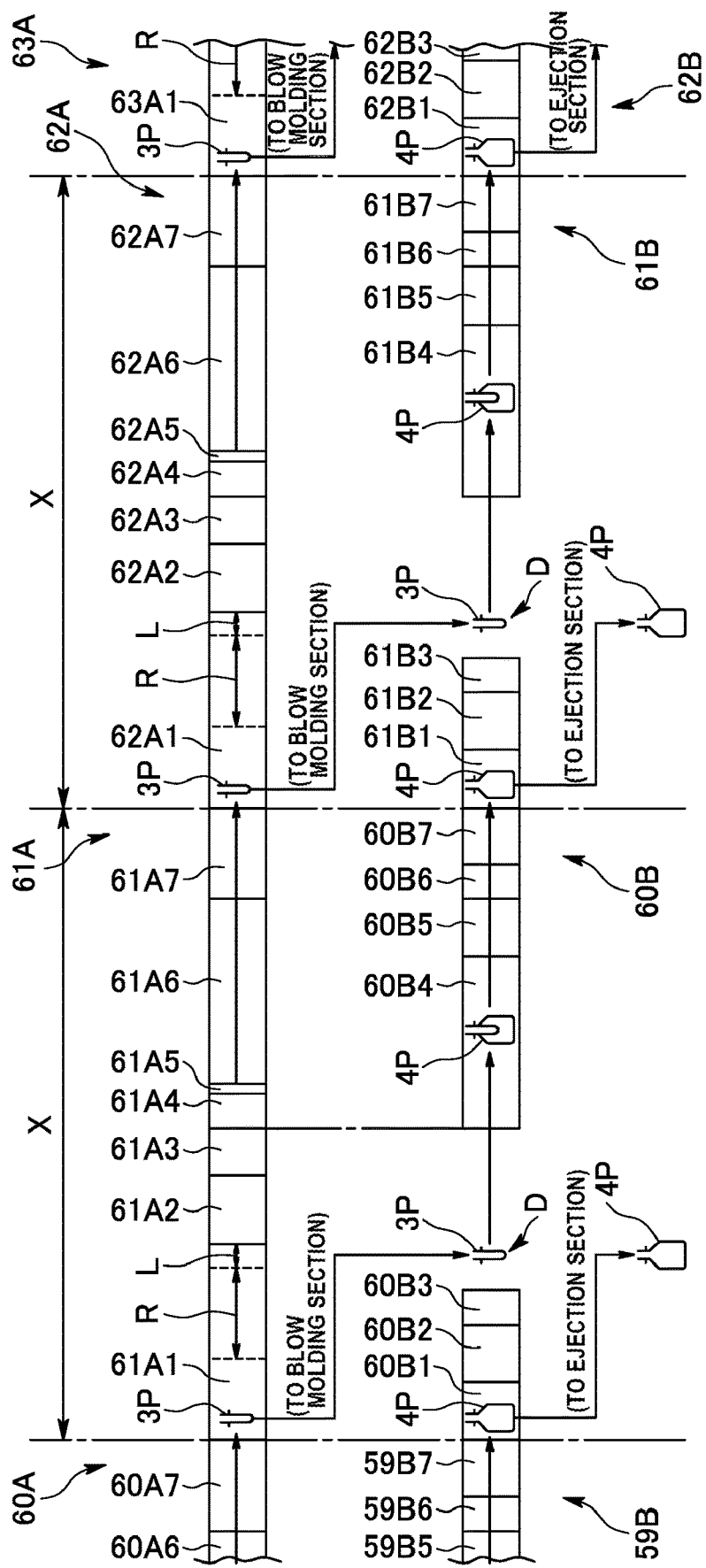
FIG. 11 is an explanatory view illustrating a molding flow including an injection molding process and a blow molding process in a second embodiment of the present invention.
Figure 12:
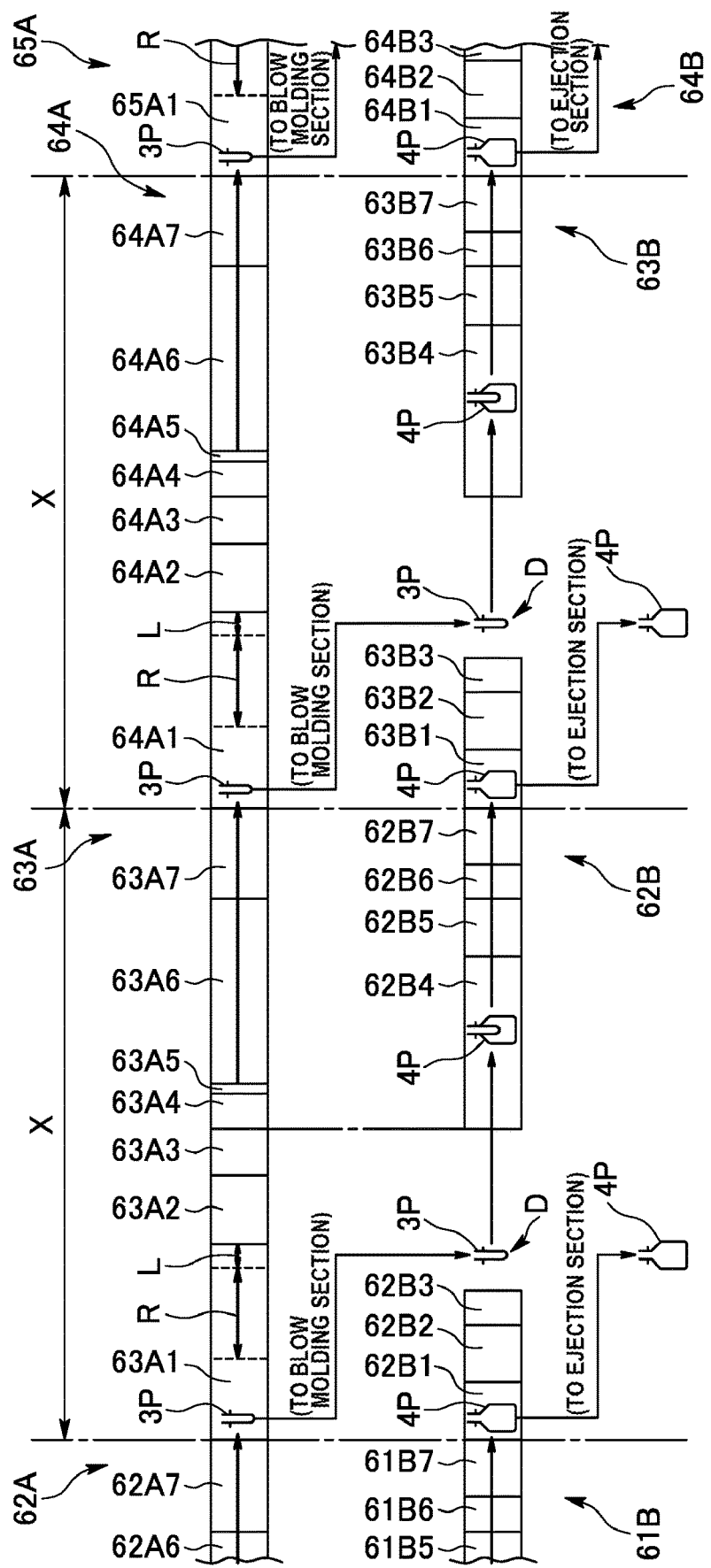
FIG. 12 is an explanatory view illustrating a molding flow including an injection molding process and a blow molding process also in the second embodiment of the present invention.

FIGS. 11 and 12 show the injection molding process 62A and the blow molding process 61B according to the second embodiment in the form of molding flows.

Injection Molding Process 62A:

In this second embodiment, the injection molding process 62A includes the upper/lower mold opening step 62A1, the upper/lower mold clamping step 62A2, the injection mold high-pressure switching step 62A3, the nozzle advancement starting step 62A4, the injection starting step 62A5, the injecting step 62A6, and the cooling step 62A7 which are configured continuously in series.

The upper/lower mold opening step 62A1, the upper/lower mold clamping step 62A2, the injection mold high-pressure switching step 62A3, the injection starting step 62A5, the injecting step 62A6, and the cooling step 62A7 are the same as those in the first embodiment.

In addition, in the second embodiment, an independent operation time is set to, for example, 0.30 seconds for the nozzle advancement starting step 62A4, and the start timing of the nozzle advancement is controlled.

The configuration of the injection molding process 62A in the second embodiment is the same as the configuration of the injection molding process 62A in the conventional example.

Blow Molding Process 61B:

In the second embodiment, the blow molding process 61B includes the blow mold closing starting step 61B1, the blow mold quick operation step 61B2, the blow mold high-pressure switching step 61B3, the blowing step 61B4, the blow air exhausting step 61B5, the blow mold pressure releasing step 61B6, and the blow mold opening step 61B7, and thus the second embodiment is the same the first embodiment in that the second embodiment includes these steps 61B1 to 61B7.

Furthermore, as described above, the second embodiment is the same as the first embodiment in that the blow mold high-pressure switching step 61B3 is started continuously with the completion of the step of the blow mold quick operation step 61B2.

As shown in FIGS. 8, 9, 11, and 12, both the first embodiment and the second embodiment are configured to start the blowing step 61B4 at a timing continuous with the completion of the injection mold high-pressure switching step 62A3.

However, as described above, in the second embodiment, the time set for the blowing step 61B4 is different from that in the first embodiment.

In the second embodiment, the time required for the blowing step 61B4 as shown in FIGS. 11 and 12 is set to the time obtained by combining the time corresponding to the blowing step 61B4 in the first embodiment and the time corresponding to the nozzle advancement starting step 62A4 in the injection molding process 62A. That is, the time set for the blowing step 61B4 of the second embodiment is extended as compared to the time set for the blowing step 61B4 in the blow molding process 61B of the first embodiment.

Then, in this second embodiment, the completion timing of the blow mold opening step 61B7, which is the final step of the blow molding process 61B, is designed to coincide with the completion timing of the cooling step 62A7, which is the final step of the injection molding step 62A.

In this manner, in the second embodiment, the blowing step 61B4 is extended, that is, the time for blow molding the hollow molded article by performing the stretching and blow-air blowing to the preform disposed in the pair of blow molds, which has been cooled, is increased. Thus, the shape-imparting properties for molded articles is improved, and the cooling efficiency is improved.

In both the first and second embodiments, the blow mold high-pressure switching step 61B3 is performed continuously with the completion of the blow mold quick operation step 61B2 during the operation of the rotation R of the injection molding process 62A, and, the present invention is not limited to the above-described embodiments.

For example, the time set for the blow mold closing starting step 61B1 and the blow mold quick operation step 61B2 may be shortened, and the blow mold high-pressure switching step 61B3 may be set within a time zone corresponding to a time for the injection molding process 62A where the upper/lower mold opening step 62A1 is performed.

In the present invention, the blow mold high-pressure switching step 61B3 can also be set within a time zone on the blow molding process corresponding to a portion from the start of the above-described upper/lower mold opening step 62A1 of the injection molding process 62A to the completion of the injection mold high-pressure switching step 62A3.

Since the hollow molded article producing process 6 (61, 62, 63, 64, . . . ) is repeatedly performed in the injection stretch blow molding machine 1, for ease of explanation, the blow molding process 61B of the hollow molded article producing process 61 has been described, and the injection molding process 62A of the hollow molded article producing process 62 has been described. Of course, the first and second embodiments described above are not limited to the blow molding process 61B and also to the injection molding process 62A.

REFERENCE SIGNS LIST

1 injection stretch blow molding machine
2 injection apparatus
3 injection molding section
4 blow molding section
5 ejection section
6 61, 62, 63, 64 hollow molded article producing process
7 blow mold
8 lip mold
9 blow molding mold
13 high-pressure mold clamping force
14 bottom mold
16 blowing apparatus
17 base plate
18 blowing apparatus positioning stopper
60A, 61A, 62A, 63A, 64A, 65A injection molding process
61A1, 62A1, 63A1, 64A1, 65A1 upper/lower mold opening step
61A2, 62A2, 63A2, 64A2 upper/lower mold clamping step
61A3, 62A3, 63A3, 64A3 injection mold high-pressure switching step
61A4, 62A4, 63A4, 64A4 nozzle advancement starting step
61A5, 62A5, 63A5, 64A5 injection starting step
60A6, 61A6, 62A6, 63A6, 64A6 injecting step
60A7, 61A7, 62A7, 63A7, 64A7 cooling step
R rotation
L rotation lock
59B, 60B, 61B, 62B, 63B, 64B blow molding process
60B1, 61B1, 62B1, 63B1, 64B1 blow mold closing starting step
60B2, 61B2, 62B2, 63B2, 64B2 blow mold quick operation step
60B3, 61B3, 62B3, 63B3, 64B3 blow mold high-pressure switching step
60B4, 61B4, 62B4, 63B4, 64B4 blowing step
59B5, 60B5, 61B5, 62B5, 63B5, 64B5 blow air exhausting step
59B6, 60B6, 61B6, 62B6, 63B6, 64B6 blow mold pressure releasing step
59B7, 60B7, 61B7, 62B7, 63B7, 64B7 blow mold opening step
3P preform
4P hollow molded article

What is claimed is:

1. A method for producing a hollow molded article using an injection stretch blow molding machine in which an injection molding section having an injection molding mold, which includes a combination of an upper mold, a lower mold, and a lip mold, and a blow molding section having a blow molding mold, which includes a combination of a blow mold and the lip mold, are disposed on a base plate, and in which a plurality of hollow molded article producing processes are performed simultaneously, the hollow molded article producing process including:

an injection molding process of injection molding a preform in an injection molding section;

a blow molding process of blow molding a hollow molded article from the preform in a blow molding section wherein the blow molding section includes:

a blowing apparatus including a mold clamping mechanism configured to open and close the blow molding mold; and a blowing apparatus positioning stopper configured to press the blowing apparatus laterally in a direction along a mounting surface of the base plate on which the blowing apparatus is mounted, the blowing apparatus is positioned by the blowing apparatus positioning stopper so that a lip mold arrangement position in the blow molding mold where a high-pressure mold clamping force is applied in the direction along the mounting surface of the base plate on which the blowing apparatus is mounted corresponds to a lip mold lowering position in the blow molding section;

when the injection molding process in a first hollow molded article producing process among the plurality of hollow molded article producing processes is performed in the injection molding section, the blow molding process in a second hollow molded article producing process prior to the first hollow molded article producing process is performed in the blow molding section; and the high-pressure mold clamping force in the direction along the mounting surface of the base plate on which the blowing apparatus is mounted is applied to the blow molding mold of the blowing apparatus which has been positioned so as to correspond to the lip mold lowering position to perform a blow mold high-pressure switching step during the blow molding process in the second hollow molded article producing process within a time from start of an injection mold opening step during the injection molding process to completion of the injection mold high-pressure switching step.

2. The method of claim 1, wherein the blow mold high-pressure switching step during the blow molding process in the second hollow molded article producing process includes increasing a mold clamping force for the blow mold that has been closed.

3. An injection stretch blow molding machine comprising, on a base plate:

an injection molding section having an injection molding mold, which includes a combination of an upper mold, a lower mold, and a lip mold; and a blow molding section having a blow molding mold, which includes a combination of a blow mold and a lip mold, wherein the blow molding section includes:
  a blowing apparatus including a mold clamping mechanism configured to open and close the blow molding mold; and
  a blowing apparatus positioning stopper configured to press the blowing apparatus laterally in a direction along a mounting surface of the base plate on which the blowing apparatus is mounted; and
the blowing apparatus is positioned by the blowing apparatus positioning stopper so that a lip mold arrangement position in the blow molding, to which a high-pressure mold clamping force is applied in the direction along the mounting surface on which the blowing apparatus is mounted, corresponds to a lip mold lowering position in the blow molding section.

4. The method of claim 1, wherein the blowing apparatus positioning stopper includes:
  a fixed body having an inclined surface, which is inclined with respect to a vertical direction, at an end portion thereof on a side closer to the blowing apparatus; and
  a pressing body which is to be overlaid on the fixed body while being capable of moving in the vertical direction, and which is configured to be pushed in the direction along the mounting surface on which the blowing apparatus is mounted, while being guided along the inclined surface to be lowered, and the pressing body presses the blowing apparatus.

5. The injection stretch blow molding machine of claim 3, wherein:
  the blowing apparatus positioning stopper includes a fixed body having an inclined surface, which is inclined with respect to a vertical direction, at an end portion thereof on a side closer to the blowing apparatus; and
  a pressing body which is to be overlaid on the fixed body while being capable of moving in the vertical direction, and which is configured to be pushed in the direction along the mounting surface on which the blowing apparatus is mounted, while being guided along the inclined surface to be lowered and the pressing body presses the blowing apparatus.

\* \* \* \* \*